United States Patent
Naskar

(10) Patent No.: US 9,453,129 B2
(45) Date of Patent: Sep. 27, 2016

(54) POLYMER BLEND COMPOSITIONS AND METHODS OF PREPARATION

(71) Applicant: UT-BATTELLE, LLC, Oak Ridge, TN (US)

(72) Inventor: Amit K. Naskar, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 68 days.

(21) Appl. No.: 14/311,893

(22) Filed: Jun. 23, 2014

(65) Prior Publication Data

US 2015/0368471 A1    Dec. 24, 2015

(51) Int. Cl.

| | |
|---|---|
| *C08K 3/38* | (2006.01) |
| *C08L 97/00* | (2006.01) |
| *C08K 3/22* | (2006.01) |
| *C08L 9/00* | (2006.01) |
| *C08L 9/02* | (2006.01) |
| *C08L 9/06* | (2006.01) |
| *C08L 21/00* | (2006.01) |
| *C08L 71/02* | (2006.01) |
| *C08L 87/00* | (2006.01) |

(52) U.S. Cl.
CPC .............. *C08L 97/005* (2013.01); *C08K 3/22* (2013.01); *C08L 9/00* (2013.01); *C08L 9/02* (2013.01); *C08L 9/06* (2013.01); *C08L 21/00* (2013.01); *C08L 71/02* (2013.01); *C08L 87/005* (2013.01); *C08K 2003/2296* (2013.01)

(58) Field of Classification Search
CPC ............................... C08K 3/38; C08L 97/005
USPC .......................................... 524/72, 404, 405
See application file for complete search history.

(56) References Cited

U.S. PATENT DOCUMENTS

| | | |
|---|---|---|
| 2,341,553 A | 2/1944 | Houtz |
| 3,230,201 A | 1/1966 | Hart et al. |
| 3,892,720 A | 7/1975 | Jahnke |
| 4,260,702 A | 4/1981 | Schultz et al. |
| 5,006,603 A | 4/1991 | Takaki et al. |
| 5,229,202 A | 7/1993 | Tomono et al. |
| 5,302,666 A | 4/1994 | Hino et al. |
| 5,534,235 A | 7/1996 | Reed et al. |
| 6,103,865 A | 8/2000 | Bae et al. |
| 6,555,617 B1 | 4/2003 | Tanaka et al. |
| 8,445,141 B2 | 5/2013 | Kitamura et al. |
| 8,637,174 B2 | 1/2014 | Häring et al. |
| 8,748,537 B2 | 6/2014 | Naskar et al. |
| 2006/0116436 A1 | 6/2006 | Okamitsu et al. |
| 2006/0258836 A1 | 11/2006 | McGrath et al. |
| 2012/0003471 A1 | 1/2012 | Bissett et al. |
| 2013/0084455 A1 | 4/2013 | Naskar et al. |
| 2013/0116383 A1 | 5/2013 | Naskar et al. |
| 2013/0214442 A1 | 8/2013 | Naskar |
| 2014/0045996 A1 | 2/2014 | Naskar et al. |

FOREIGN PATENT DOCUMENTS

| | | |
|---|---|---|
| CN | 1781980 A | 6/2006 |
| CN | 103361025 A | 10/2013 |
| WO | WO 2013/156996 A1 | 10/2013 |
| WO | WO 2013/156997 A1 | 10/2013 |

OTHER PUBLICATIONS

Achary P.S. et al., "Reactive Compatibilization of a Nitrile Rubber/Phenolic Resin Blend: Effect on Adhesive and Composite Properties", *Journal of Applied Polymer Science* 69:1187-2101 (1998).

Cui C. et al., "Toward Thermoplastic Lignin Polymers; Part II: Thermal & Polymer Characteristics of Kraft Lignin & Derivatives", *BioResources* 8(1):864-886 (2013).

Sadeghifar H. et al., "Toward Thermoplastic Lignin Polymers. Part 1. Selective Masking of Phenolic Hydroxyl Groups in Kraft Lignins Via Methylation and Oxypropylation Chemistries", *Industrial & Engineering Chemistry Research* 51(51):16713-16720 (2012).

Saito T. et al., "Development of Lignin-Based Polyurethane Thermoplastics", *RSC Advances* 3:21832-21840 (2013).

Saito T. et al., "Turning Renewable Resources into Value-Added Polymer: Development of Lignin-Based Thermoplastic", *Green Chemistry* 14:3295-3303 (2012).

"Fully Bio-Based Thermoplastic Lignin Composites", Biomaterials-Towards Industrial Applications Källe Nättinen, Antti Ojala, Lisa Wikström, VTT Technical Research Centre of Finland (20 pages) (May 22, 2013).

International Search Report dated Sep. 14, 2015 issued in PCT/US2015/036873.

*Primary Examiner* — Edward Cain

(74) *Attorney, Agent, or Firm* — Scully Scott Murphy & Presser

(57) ABSTRACT

A polymer blend material comprising: (i) a first polymer containing hydrogen bond donating groups having at least one hydrogen atom bound to a heteroatom selected from oxygen, nitrogen, and sulfur, or an anionic version of said first polymer wherein at least a portion of hydrogen atoms bound to a heteroatom is absent and replaced with at least one electron pair; (ii) a second polymer containing hydrogen bond accepting groups selected from nitrile, halogen, and ether functional groups; and (iii) at least one modifying agent selected from carbon particles, ether-containing polymers, and Lewis acid compounds; wherein, if said second polymer contains ether functional groups, then said at least one modifying agent is selected from carbon particles and Lewis acid compounds. Methods for producing the polymer blend, molded forms thereof, and articles thereof, are also described.

18 Claims, 8 Drawing Sheets

POLYMER BLEND COMPOSITIONS AND METHODS OF PREPARATION

This invention was made with government support under Prime Contract No. DE-AC05-00OR22725 awarded by the U.S. Department of Energy. The government has certain rights in the invention.

FIELD OF THE INVENTION

The present invention relates generally to polymer blend and composite compositions, and more particularly, to such compositions having useful characteristics in such properties as tensile strength and toughness.

BACKGROUND OF THE INVENTION

Numerous structural materials available today are characterized by either good mechanical (i.e., tensile) strength or good elongation (toughness), but typically not having a combination of these two characteristics that result in a robust or rugged (i.e., strong yet tough) material. Materials having such improved physical characteristics would be useful and advantageous in numerous applications, including in critical structural and impact resistant applications where high loads or sudden mechanical stresses are encountered. In such applications, materials with high tensile strength but low toughness are prone to failure by virtue of their brittleness. Materials that possess a high tensile strength along with improved toughness are much less prone to such failure.

SUMMARY OF THE INVENTION

The instant disclosure is directed to high performance polymer blends and their composites useful as industrial plastic resins and structural materials for a number of applications. The polymer blends described herein are characterized by a combination of beneficial mechanical properties (e.g., high strength and toughness) that make them particularly useful in critical structural applications where high loads or mechanical stresses are encountered. In many embodiments, the polymer blends described herein are thermoplastic, which advantageously provide them with a sufficient degree of moldability, elasticity, recyclability, and/or ductility to mold them into a variety of useful shapes.

In some embodiments, the polymer blend material includes: (i) a first polymer containing hydrogen bond donating groups in which at least one hydrogen atom is bound to a heteroatom selected from oxygen, nitrogen, and sulfur, (e.g., hydroxy, amine, amide, thiol, carboxy, sulfonic acid, and phosphonic acid groups), or an anionic version of the first polymer wherein at least a portion of the hydrogen atoms bound to a heteroatom is absent and replaced with at least one electron pair; (ii) a second polymer containing hydrogen bond accepting groups, such as those selected from nitrile, halogen, and ether functional groups; and (iii) at least one modifying agent selected from carbon particles, ether-containing polymers, and Lewis acid compounds. In the polymer blend material, if the second polymer contains ether functional groups, then the at least one modifying agent is selected from carbon particles and Lewis acid compounds. Generally, the Lewis acid compound is non-polymeric in nature.

The instant disclosure is also directed to methods for producing any of the polymer blend materials or composites described above. In particular embodiments, the method includes homogeneously blending a mixture that includes components (i), (ii), and (iii). The method may also include a molding process, which may include any of the shaping, heating, and/or pressing processes known in the art, to produce a shaped article of the polymer blend material.

DETAILED DESCRIPTION OF THE INVENTION

In a first aspect, the instant disclosure is directed to a polymer blend material that includes: (i) a first polymer containing hydrogen bond donating groups, such as those selected from hydroxy, amine, thiol, carboxy, sulfonic acid, and phosphonic acid groups, or a combination thereof; (ii) a second polymer containing hydrogen bond accepting groups, such as those selected from nitrile, halogen, and ether functional groups, or a combination thereof; and (iii) at least one modifying agent selected from carbon particles, ether-containing polymers, and Lewis acid compounds. The hydrogen bond donating groups contain at least one hydrogen atom bound to a heteroatom (i.e., other than carbon, such as oxygen, sulfur, or nitrogen) so that the hydrogen atom can participate in a hydrogen bonding interaction with a hydrogen bond accepting group. The hydrogen bond accepting groups typically do not contain a hydrogen atom bound to a heteroatom. The term "polymer", as used herein, generally refers to a molecule having at least or greater than 5, 10, 15, 20, 30, 40, or 50 connected monomeric units, and can be a homopolymer or copolymer, wherein the copolymer may be, for example, a block, random, alternating, graft, or branched copolymer.

Figure 1:
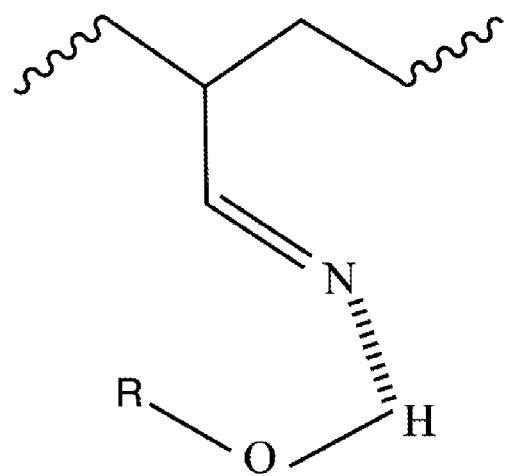
FIGS. 1A, 1B. Representative chemical structures showing hydrogen bonding (FIG. 1A) and dative bonding (FIG. 1B) sites.
Figure 1B:
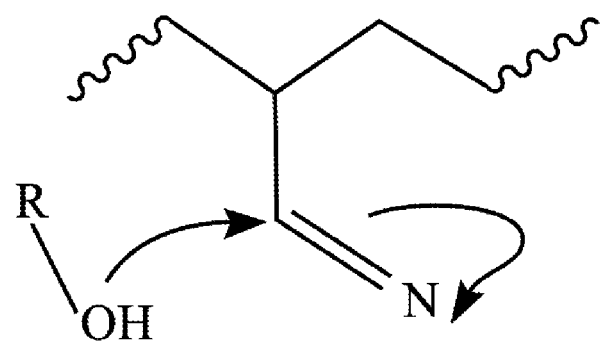

In a first embodiment, the first polymer containing hydrogen bond donating groups engages with the second polymer containing hydrogen bond accepting groups via hydrogen bond interactions between hydrogen atoms of the first polymer and hydrogen accepting groups of the second polymer. A representative hydrogen bond interaction is depicted in FIG. 1A for the case of a hydroxy-containing first polymer and a nitrile-containing second polymer. In a second embodiment, the first polymer containing hydrogen bond donating groups engages with the second polymer containing hydrogen bond accepting groups via a dative bonding interaction. Dative bonds, also known as dipolar bonds, are covalent bonds resulting from an interaction between an electron-rich region of a molecule (i.e., one or more pairs of electrons on one or more atoms, as provided by a Lewis base) and an electron-poor region of another molecule. A representative dative bond interaction is depicted in FIG. 1B, also for the case of a hydroxy-containing first polymer and a nitrile-containing second polymer. Significantly, certain adjustments in conditions may encourage the first polymer to interact with the second polymer either by a hydrogen bond or dative bond interaction. A particular condition that may alter the type of interaction is the pH. For example, carboxylic acid or phenolic groups in a first polymer may be partially or completely deprotonated by interaction with a base (e.g., a metal hydroxide, such as sodium hydroxide), in which case the deprotonated carboxylic acid (i.e., carboxylate) or deprotonated phenol (i.e., phenoxide) engages partially or exclusively with the second polymer by a dative bonding interaction. Thus, in view of the foregoing considerations, the term "hydrogen bond donating groups" may, in some embodiments, refer to groups that do not possess a hydrogen atom that can engage in a hydrogen bonding interaction, and instead include anionic groups having one or more pairs of electrons that can engage in a dative bonding interaction. In other embodiments, a protic acid (e.g., a strong or weak mineral or organic acid, such as HCl or acetic acid) may be included to ensure a predominant hydrogen bonding interaction. Some functional groups (e.g., alcohol or amines) may interact alternatively or simultaneously by a hydrogen bonding and/or dative bonding interaction.

In one embodiment, the terms "first polymer" and "second polymer" refer to separate polymers. In the event of a single polymer containing functional groups selected from both first and second polymers (e.g., an acrylonitrile-vinyl alcohol copolymer, as described in U.S. Pat. No. 3,388,199), the single polymer may be taken as either the first or second polymer (i.e., components (i) or (ii)), but does not serve as both the first and second polymers. As PAN-acrylic acid copolymers, in particular, are often used in place of pure PAN polymers for similar applications, the instant disclosure will typically regard the PAN-acrylic acid polymer as belonging to the first or the second polymer and not serving as both the first and second polymers, although the instant disclosure may include the possibility of PAN-acrylic acid serving as both the first and second polymers. In some embodiments, the second polymer does not contain one or more of any of the hydrogen bond donating groups described above or any hydrogen bond donating groups altogether, and/or the first polymer does not contain one or more of any of the hydrogen bond accepting groups described above or any hydrogen bond accepting groups altogether. In another embodiment, a single polymer containing functional groups selected from both first and second polymers can serve as both components (i) and (ii). In the latter embodiment, the polymer blend could include only two components, i.e., the single polymer containing functional groups selected from both first and second polymers (e.g., acrylonitrile-vinyl alcohol copolymer) in combination with the modifying agent of component (iii). Thus, the polymer blend includes the possibility of separate first and second polymers (i.e., separate components i and ii), or a single polymer serving as both components i and ii, wherein either the two separate polymers or single polymer are in combination with the at least one modifying agent (component iii) in the polymer blend. In the case of a polymer not having overlapping functional groups of components (i) and (ii) (i.e., a first polymer not having any hydrogen bond accepting groups acceptable for the second polymer, or a second polymer not having any hydrogen bond donating groups), the polymer blend does not include the possibility of combining the component (iii) with the first polymer in the absence of the second polymer, or combining the component (iii) with the second polymer without the first polymer. Both hydrogen bond donating and hydrogen bond accepting groups need be present, either in separate polymers or in a single polymer, to properly serve as components (i) and (ii).

The polymer of (i) and/or (ii) can independently have any of a wide range of weight-average molecular weights ($M_w$), such as precisely, about, at least, above, up to, or less than, for example, 10,000,000 g/mol, 5,000,000 g/mol, 1,000,000 g/mol, 500,000 g/mol, 400,000 g/mol, 300,000 g/mol, 200,000 g/mol, 100,000 g/mol, 50,000 g/mol, 10,000 g/mol, 5,000 g/mol, 2,500 g/mol, 2,000 g/mol, 1,500 g/mol, 1,000 g/mol, 500 g/mol, or 250 g/mol, or within a range bounded by any two of the foregoing exemplary values. The polymers may also independently have any of a wide range of number-average molecular weights $M_n$, wherein n can correspond to any of the numbers provided above for $M_w$, as well as, for example, 5, 10, 20, 50, 100, or 200, and wherein $M_n$ may correspond to any of the $M_w$ values provided above or a range therein.

A polymer containing hydroxy (OH) groups can have the hydroxy groups bound to aliphatic (i.e., non-aromatic, e.g., alkyl or alkenyl) or aromatic groups. In some embodiments, the hydroxy groups are bound at least partly or only to aliphatic groups, while in other embodiments, the hydroxy groups are bound at least partly or only to aromatic (e.g., phenyl) groups, while still in other embodiments, the hydroxy groups are bound at least partly or only to both aliphatic and aromatic groups. Some examples of hydroxy-containing polymers include polyvinyl alcohol, the polysaccharides (e.g., cellulose, hemicellulose, starches, dextran, chitin, chitosan, and pectins), hydroxy-containing vinyl addition polymers (e.g., poly(2-hydroxyethyl acrylate)), hydroxy-containing polyimides, and phenol-containing polymers, such as lignin, tannin, poly(vinylphenol), poly(styrene-co-allyl alcohol), phenol-formaldehyde resins, novolaks, and resoles. In some embodiments, the hydroxy-containing polymer contains only hydroxy functional groups, as attached to a hydrocarbon backbone, while in other embodiments, the hydroxy-containing polymer includes functional groups other than hydroxy groups, such as ether groups, carboxy groups, or amino groups. All of the hydroxy-containing polymers described above are well known in the art. In one embodiment, the hydroxy-containing polymer can function only as a first polymer (component i) if it does not contain hydrogen bond accepting groups (or only hydroxy functional groups). In another embodiment, the hydroxy-containing polymer can also (i.e., in addition) function as a second polymer (component ii) if it contains hydrogen bond accepting groups (e.g., nitrile or ether groups).

In particular embodiments, the hydroxy-containing polymer is a lignin. The lignin can be any of the wide variety of lignin compositions found in nature or as known in the art. As known in the art, the lignin compositions found in nature are generally not uniform. Lignin is a random polymer that shows significant compositional variation between plant species. Many other conditions, such as environmental conditions, age, and method of processing, influence the lignin composition. Lignins differ mainly in the ratio of three alcohol units, i.e., p-coumaryl alcohol, guaiacyl alcohol, and sinapyl alcohol. The polymerization ofp-coumaryl alcohol, coniferyl alcohol, and sinapyl alcohol forms the p-hydroxyphenyl (H), guaiacyl (G) and syringyl (S) components of the lignin polymer, respectively. The precursor lignin can have any of a wide variety of relative weight percents (wt %) of H, G, and S components. As observed in some seeds, lignin may also consist of caffeyl alcohol units, e.g., Chen et al. PNAS, 109(5), 1772-1777 (2012). For example, the precursor lignin may contain, independently for each component, at least, up to, or less than 1 wt %, 2 wt %, 5 wt %, 10 wt %, 20 wt %, 30 wt %, 40 wt %, 50 wt %, 60 wt %, 70 wt %, 80 wt %, or 90 wt %, or a range thereof, of any of the caffeyl alcohol, H, G, and S components. Typically, the sum of the wt % of each alcohol component is 100%, or at least 98% if other minor components are considered. Different wood and plant sources (e.g., hardwood, softwood, switchgrass, and bagasse) often widely differ in their lignin compositions.

Besides the natural variation of lignins, there can be further compositional variation based on the manner in which the lignin has been processed. For example, the precursor lignin can be a Kraft lignin, sulfite lignin (i.e., lignosulfonate), or a sulfur-free lignin. As known in the art, a Kraft lignin refers to lignin that results from the Kraft process. In the Kraft process, a combination of sodium hydroxide and sodium sulfide (known as "white liquor") is reacted with lignin present in biomass to form a darkcolored lignin bearing thiol groups. Kraft lignins are generally water- and solvent-insoluble materials with a high concentration of phenolic groups. They can typically be made soluble in aqueous alkaline solution. As also known in the art, sulfite lignin refers to lignin that results from the sulfite process. In the sulfite process, sulfite or bisulfate (depending on pH), along with a counterion, is reacted with lignin to form a lignin bearing sulfonate ($SO_3H$) groups. The sulfonate groups impart a substantial degree of water-solubility to the sulfite lignin. There are several types of sulfurfree lignins known in the art, including lignin obtained from biomass conversion technologies (such as those used in ethanol production), solvent pulping (i.e., the "organosolv" process), and soda pulping. In particular, organosolv lignins are obtained by solvent extraction from a lignocellulosic source, such as chipped wood, followed by precipitation. Due to the significantly milder conditions employed in producing organosolv lignins (i.e., in contrast to Kraft and sulfite processes), organosolv lignins are generally more pure, less degraded, and generally possess a narrower molecular weight distribution than Kraft and sulfite lignins. These lignins can also be thermally devolatilized to produce a variant with less aliphatic hydroxyl groups, and molecularly restructured forms with an elevated softening point. Any one or more of the foregoing types of lignins may be used (or excluded) as a component in the method described herein for producing a polymer blend.

The lignin may also be an engineered form of lignin having a specific or optimized ratio of H, G, and S components. Lignin can be engineered by, for example, transgenic and recombinant DNA methods known in the art that cause a variation in the chemical structure in lignin and overall lignin content in biomass (e.g., F. Chen, et al., *Nature Biotechnology*, 25(7), pp. 759-761 (2007) and A. M. Anterola, et al., *Phytochemistry*, 61, pp. 221-294 (2002)). The engineering of lignin is particularly directed to altering the ratio of G and S components of lignin (D. Guo, et al., *The Plant Cell*, 13, pp. 73-88, (January 2001). In particular, wood pulping kinetic studies show that an increase in S/G ratio significantly enhances the rate of lignin removal (L. Li, et al., *Proceedings of The National Academy of Sciences of The United States of America*, 100 (8), pp. 4939-4944 (2003)). The S units become covalently connected with two lignol monomers; on the other hand, G units can connect to three other units. Thus, an increased G content (decreasing S/G ratio) generally produces a highly branched lignin structure with more C—C bonding. In contrast, increased S content generally results in more β-aryl ether (β-O-4) linkages, which easily cleave (as compared to C—C bond) during chemical delignification, e.g., as in the Kraft pulping process. It has been shown that decreasing lignin content and altering the S/G ratio improve bioconvertability and delignification. Thus, less harsh and damaging conditions can be used for delignification (i.e., as compared to current practice using strong acid or base), which would provide a more improved lignin better suited for higher value-added applications, including manufacturing of tough polymer blends, carbon materials production (e.g., carbon fiber, carbon powder, activated carbon, microporous and mesoporous carbon) and pyrolytic or catalytic production of aromatic hydrocarbon feedstock.

Lab-scale biomass fermentations that leave a high lignin content residue have been investigated (S. D. Brown, et al., *Applied Biochemistry and Biotechnology*, 137, pp. 663-674 (2007)). These residues will contain lignin with varied molecular structure depending on the biomass source (e.g., wood species, grass, and straw). Production of value-added products from these high quality lignins would greatly improve the overall operating costs of a biorefinery. Various chemical routes have been proposed to obtain value-added products from lignin (J. E. Holladay, et al., Top Value-Added Chemicals from Biomass: Volume II—Results of Screening for Potential Candidates from Biorefinery Lignin, DOE Report, PNNL-16983 (October 2007)).

The lignin may, in some embodiments be a crosslinked lignin that is melt-processible or amenable to melt-processing. By being "crosslinked" is meant that the lignin contains methylene (i.e., —$CH_2$—) and/or ethylene (i.e., —$CH_2CH_2$—) linkages (i.e., linking groups) between phenyl ring carbon atoms in the lignin structure. By being "melt-processible" is meant that the crosslinked lignin can be melted or converted to a molten, highly viscous, or rubbery state starting at a particular glass transition temperature. The melted or highly viscous lignin can then be more easily processed, such as by mixing, molding, applying on a surface, or dissolving in a solvent.

The isolated lignin may have a number-average or weight-average molecular weight (i.e., $M_n$ or $M_w$, respectively) of at least 300, 500, 1,000, 5,000, or 10,000 g/mol. In different embodiments, the lignin may be crosslinked to an extent that it has a number-average or weight-average molecular weight of precisely, about, at least, or greater than, for example, 10,000 g/mol, 25,000 g/mol, 50,000 g/mol, 75,000 g/mol, 100,000 g/mol, 125,000 g/mol, 150,000 g/mol, 175,000 g/mol, or 200,000 g/mol, or a molecular weight within a range bounded by any two of the foregoing exemplary values.

The glass transition temperature ($T_g$) of the crosslinked lignin is generally above room temperature (typically, 15, 20, 25, or 30° C.). In different embodiments, the lignin (either isolated lignin from biomass or its crosslinked derivative) has a glass transition temperature of precisely, about, at least, or greater than 40° C., 50° C., 60° C., 70° C., 80° C., 90° C., 100° C., 105° C., 110° C., 115° C., 120° C., 125° C., 130° C., 140° C., 150° C., 160° C., 170° C., 180° C., 190° C., 200° C., 210° C., 220° C., 230° C., 240° C., or 250° C., or a $T_g$ within a range bounded by any two of the foregoing values.

The lignin (in either raw form isolated from biomass or its crosslinked derivative) is preferably substantially soluble in a polar organic solvent or aqueous alkaline solution. As used herein, the term "substantially soluble" generally indicates that at least 1, 2, 5, 10, 20, 30, 40, 50, or 60 grams of the lignin completely dissolves in 1 deciliter (100 mL) of the polar organic solvent or aqueous alkaline solution. In other embodiments, the solubility is expressed as a wt % of the lignin in solution. In particular embodiments, the lignin has sufficient solubility to produce at least a 5 wt %, 10 wt %, 15 wt %, 20 wt %, 30 wt %, 40 wt %, or 50 wt % solution in the polar organic solvent or aqueous alkaline solution. The polar organic solvent can be aprotic or protic. Some examples of polar aprotic solvents include the organoethers (e.g., diethyl ether, tetrahydrofuran, and dioxane), nitriles (e.g., acetonitrile, propionitrile), sulfoxides (e.g., dimethylsulfoxide), amides (e.g., dimethylformamide, N,N-dimethylacetamide), organochlorides (e.g., methylene chloride, chloroform, 1,1-trichloroethane), ketones (e.g., acetone, 2-butanone), and dialkylcarbonates (e.g., ethylene carbonate, dimethylcarbonate, diethylcarbonate). Some examples of polar organic protic solvents include the alcohols (e.g., methanol, ethanol, isopropanol, n-butanol, t-butanol, the pentanols, hexanols, octanols, or the like), diols (e.g., ethylene glycol, diethylene glycol, triethylene glycol), and protic amines (e.g., ethylenediamine, ethanolamine, diethanolamine, and triethanolamine). The aqueous alkaline solution can be any aqueous-containing solution having a pH of at least (or over) 8, 9, 10, 11, 12, or 13. The alkalizing solute can be, for example, an alkali hydroxide (e.g., NaOH or KOH), ammonia, or ammonium hydroxide. Combinations of any of these solvents may also be used. In some embodiments, one or more classes or specific types of solvents are excluded.

A polymer containing other hydrogen bond donating groups, such as amine (—$NH_2$ or —NHR, where R is a hydrocarbon), amide (—$C(O)NH_2$ or —C(O)NHR, where R is a hydrocarbon), thiol (—SH), carboxy (—COOH), sulfonic acid (—$SO_3H$), sulfonamide (—$SO_2NH_2$), and phosphonic acid (—$PO_3H_2$) groups, can have the hydrogen bond donating groups bound to aliphatic (i.e., non-aromatic, e.g., alkyl or alkenyl) or aromatic groups, as described above for a hydroxy-containing polymer. Some examples of amine-containing polymers include polyaniline, poly(vinylaniline), polyvinylamine, polyetheramines, and amino-containing polyphosphazenes. An example of an amide-containing polymer includes polyacrylamide and polyamides (e.g., nylon). Some examples of thiol-containing polymers include poly(vinyl thiol), thiolated chitosans (e.g., chitosan-thiobuylamidine), and poly-ρ-mercaptostyrene. Some examples of carboxy-containing polymers include polyacrylic acid, polymethacrylic acid, poly(4-vinylbenzoic acid), polymaleic acid, polyfumaric acid, polyaspartic acid, and polyglutamic acid. Some examples of sulfonic acid-containing polymers include poly(vinylsulfonic acid), poly(vinylbenzoic sulfonic acid), poly(2-acrylamido-2-methylpropane sulfonic acid), sulfonated polyolefins (e.g., U.S. Application Pub. Nos. 2013/0084455 and 2013/0214442, the contents of which are herein incorporated by reference), and other such polymers disclosed in, for example, U.S. Pat. Nos. 3,230, 201 and 8,445,141, the contents of which are herein incorporated by reference. Some examples of sulfonamide-containing polymers include the pH-sensitive polymers and gels of this class (e.g., by polymerization of 4-amino-N-[4,6-dimethyl-2-pyrimidinyl]benzene sulfonamide), as further described in, for example, U.S. Pat. No. 6,103,865; S. Kang et al., *Macromolecular Symposia*, vol. 172, issue 1, pp. 149-156, July 2001; and S. Y. Park, et al., *Macromolecular Rapid Communications*, vol. 20, issue 5, p. 269-273, May 1999, the contents of which are herein incorporated by reference. Some examples of phosphonic acid-containing polymers include those derived by addition polymerization of vinyl phosphonic acid, vinylidene diphosphonic acid, isopropenyl phosphonic acid, and 2-acrylamido-2-methylpropanephosphonic acid, such as described in, for example, U.S. Pat. Nos. 5,534,235 and 8,637,174, the contents of which are herein incorporated by reference. All of the polymers described above are well known in the art. In one embodiment, the polymer containing hydrogen bond donating groups can function only as a first polymer (component i) if it does not contain hydrogen bond accepting groups (or only one or more types of hydrogen bond donating groups). In another embodiment, the polymer containing hydrogen bond donating groups can also (i.e., in addition) function as a second polymer (component ii) if it contains hydrogen bond accepting groups (e.g., nitrile or ether groups).

The polymer containing nitrile groups, as provided in component (ii), can have the nitrile groups bound to aliphatic (i.e., non-aromatic, e.g., alkyl or alkenyl) or aromatic groups, as described above for a hydroxy-containing polymer. Some examples of nitrile-containing polymers include polyacrylonitrile (PAN), nitrile butadiene rubber (NBR), acrylonitrile butadiene styrene (ABS), styrene acrylonitrile (SAN), polymers containing aromatic nitrile groups in ion-conducting materials (e.g., U.S. Application Pub. No. 2006/0258836), and other nitrile-containing polymers, such as those described in E. N. Zil'berman, et al., *Russian Chemical Reviews*, vol. 55, no. 1, 1986, or the poly(arylene ether ether nitrile)s, as described in, for example, L. Sheng, et al., *Journal of Polymer Science, Part A: Polymer Chemistry*, vol. 52, issue 1, pp. 21-29, January 2004, the contents of which are herein incorporated by reference. Yet other nitrile-containing polymers include the polyalkylcyanoacrylates, such as polyethyl-2-cyanoacrylate) or polybutylcyanoacrylate, as well known in the art, and polymerized derivatives of any of the cyanoacrylates well known in the art as structural adhesives.

In particular embodiments, the nitrile-containing polymer is PAN or a derivative or copolymer thereof. In some embodiments, the PAN-containing polymer is homopolymeric PAN. In other embodiments, the PAN-containing polymer is a copolymer of PAN and at least one non-PAN segment or block. The PAN in such copolymers can be in a primary amount (i.e., greater than 50 mol %), secondary amount (i.e., less than 50 mol %), or equal amount. The copolymer can be, for example, a block, random, alternating, or graft copolymer. The non-PAN copolymer units are typically addition polymers derived from any of the unsaturated (generally, olefin) monomer precursors known in the art for producing such polymers. In particular embodiments, the non-PAN copolymer units are derived from unsaturated carboxylate precursor molecules, unsaturated amide precursor molecules, or a combination thereof. The unsaturated carboxylate precursor molecule generally contains at least one carbon-carbon double bond and a carboxylic acid or carboxylic ester group, wherein the olefinic group is often bound to the carbonyl carbon atom of the carboxylic acid or carboxylic ester group. Some examples of unsaturated carboxylate precursor molecules include methyl acrylate, ethyl acrylate, propyl acrylate, butyl acrylate, methylmethacrylate, (2-hydroxyethylacrylate), vinyl acetate, acrylic acid, methacrylic acid, and itaconic acid. The unsaturated amide precursor molecule generally contains at least one carbon-carbon double bond and an amide group (which can be N-substituted or N,N-disubstituted), wherein the olefinic group is often bound to the carbonyl carbon atom of the amide group. Some examples of unsaturated amide precursor molecules include acrylamide, methacrylamide, N-alkyl derivatives thereof, and N,N-dialkyl derivatives thereof.

The polymer containing halogen groups, as provided in component (ii), can have the halogen atoms bound to aliphatic (i.e., non-aromatic, e.g., alkyl or alkenyl) or aromatic groups, as described above for a hydroxy-containing polymer. The halogen atoms can be, for example, fluorine, chlorine, and bromine atoms. Some examples of fluorinated polymers include poly(vinyl fluoride), poly(vinylidene fluoride), poly(tetrafluoroethylene), fluorinated ethylene-propylene copolymer, poly(ethylenetetrafluoroethylene), poly(perfluorosulfonic acid), and fluoroelastomers. Some examples of chlorinated polymers include poly(vinyl chloride), polyvinylidene chloride, ethylene-chlorotrifluoroethylene copolymer, polychloroprene, halogenated butyl rubbers, chlorinated polyethylene, chlorosulfonated polyethylene, chlorinated polypropylene, chlorinated ethylene-propylene copolymer, and chlorinated polyvinyl chloride. Some examples of brominated polymers include poly(vinyl bromide), and brominated flame retardants known in the art, such as brominated epoxy, poly(brominated acrylate), brominated polycarbonate, and brominated polyols.

The polymer containing ether functional groups, as provided in component (ii), is herein meant to be equivalent in scope to the class of "ether-containing polymers", as provided in component (iii). The ether-containing polymer can be, for example, a polyalkylene oxide (i.e., polyethylene glycol) or a copolymer thereof. Some examples of polyalkylene oxides include the polyethylene oxides, polypropylene oxides, polybutylene oxides, and copolymers thereof or with ethylene, propylene, or allyl glycidyl ether. The ether-containing polymer may also be, for example, a polyvinyl cyanoethyl ether, as described in, for example, U.S. Pat. No. 2,341,553, the contents of which are herein incorporated by reference. The ether-containing polymer may also be, for example, an etherified form of PVA, such as poly(vinyl methyl ether), which may correspond to CAS No. 9003-09-2. The ether-containing polymer may also be, for example, a phenyl ether polymer, which may be a polyphenyl ether (PPE) or polyphenylene oxide (PPO). The ether-containing polymer may also include cyclic ether groups, such as epoxide or glycidyl groups, or as further described in, for example, U.S. Pat. No. 4,260,702, the contents of which are herein incorporated by reference. The cyclic ether polymer may also be a cyclic anhydride modified polyvinyl acetal, as further described in U.S. Pat. No. 6,555,617, or a cyclic or spirocyclic polyacetal ether, as further described in, for example, A. G. Pemba, et al., *Polym. Chem.*, 5, 3214-3221 (2014), the contents of which are herein incorporated by reference. In some embodiments, the cyclic or non-cyclic ether groups are sufficiently reactive with hydrogen bond donating groups of the first polymer so as to form covalent bonds with the first polymer. In other embodiments, the cyclic or non-cyclic ether groups are not sufficiently reactive with hydrogen bond donating groups of the first polymer so as to form covalent bonds with the first polymer. In yet other embodiments, the ether-containing polymer may be a cyclic or non-cyclic thioether-containing polymer, such as a polyphenyl thioether or polyphenylene sulfide.

In a first set of embodiments, a hydroxy-containing polymer is in admixture or combined with a nitrile-containing polymer, ether-containing polymer, or halogen-containing polymer. In a second set of embodiments, an amine-containing polymer is in admixture or combined with a nitrile-containing polymer, ether-containing polymer, or halogen-containing polymer. In a third set of embodiments, an amide-containing polymer is in admixture or combined with a nitrile-containing polymer, ether-containing polymer, or halogen-containing polymer. In a fourth set of embodiments, a thiol-containing polymer is in admixture or combined with a nitrile-containing polymer, ether-containing polymer, or halogen-containing polymer. In a fifth set of embodiments, a carboxy-containing polymer is in admixture or combined with a nitrile-containing polymer, ether-containing polymer, or halogen-containing polymer. In a sixth set of embodiments, a sulfonic acid-containing polymer is in admixture or combined with a nitrile-containing polymer, ether-containing polymer, or halogen-containing polymer. In a seventh set of embodiments, a phosphonic acid-containing polymer is in admixture or combined with a nitrile-containing polymer, ether-containing polymer, or halogen-containing polymer. For purposes of the instant invention, any one of the above combinations of polymers functions as an admixture of polymer components (i) and (ii), which is then in admixture with at least one modifying agent (component iii) to form the polymer blend material.

Any of the polymer components (i) and/or (ii), or the ether-containing polymer of component (iii), can have any suitable glass transition temperature ($T_g$), such as a $T_g$ of precisely, about, at least, above, up to, or less than, for example, $-120°$ C., $-100°$ C., $-50°$ C., $0°$ C., $10°$ C., $20°$ C., $30°$ C., $40°$ C., $50°$ C., $60°$ C., $70°$ C., $80°$ C., $90°$ C., $100°$ C., $110°$ C., $120°$ C., $130°$ C., $140°$ C., $150°$ C., $160°$ C., $170°$ C., $180°$ C., $190°$ C., or $200°$ C., or a $T_g$ within a range bounded by any two of the foregoing exemplary values. The resulting polymer blend may also have a $T_g$ selected from any of the exemplary values provided above or within a range bounded by any two of the above exemplary values.

The polymer components (i) and (ii) can be present in any suitable amount by weight (i.e., as wt %). In different embodiments, the polymer components (i) or (ii) are independently in an amount with respect to total weight of components in the final blend material of precisely, about, at least, above, up to, or less than, for example, 1 wt %, 2 wt %, 5 wt %, 10 wt %, 15 wt %, 20 wt %, 25 wt %, 30 wt %, 40 wt %, 50 wt %, 60 wt %, 70 wt %, 80 wt %, 90 wt %, 95 wt %, 98 wt %, or 99 wt %, or in an amount within a range bounded by any two of the foregoing values, wherein the term "about" generally indicates no more than ±10%, ±5%, or ±1% from an indicated value. Any of the foregoing amounts can be stated in terms of a weight ratio between components (i) and (ii). For example, if components (i) and (ii) are each in an amount of about 50 wt % with respect to total weight of components in the blend material, then (i) and (ii) are in a weight ratio of about 1:1. The combined weight of components (i) and (ii) may be, for example, at least or above 30, 40, 50, 60, 70, 80, 90 95, 98, or 99 wt % by weight of the final blend material, or within a range therein. Generally, the combined weight of components (i), (ii), and (iii) constitute the bulk of the weight of the polymer blend, i.e., the combined weight of components (i), (ii), and (iii) is typically at least or above 50, 60, 70, 80, 90 95, 98, or 99 wt % by weight of the final blend material.

The polymer components (i) and (ii) are in admixture with at least one modifying agent (component iii) selected from carbon particles, ether-containing polymers, and Lewis acid compounds, provided that, if the second polymer (component ii) or a single polymer serving as components (i) an (ii) contains ether functional groups, then the at least one modifying agent (component iii) is selected from one or both of carbon particles and Lewis acid compounds (i.e., not ether-containing polymers). In the event that the polymer of component (i) contains ether groups in addition to the hydrogen bond donating groups, then component (iii) may be an ether-containing polymer if component (ii) does not include an ether-containing polymer; wherein, if component (iii) is an ether-containing polymer, it is different from the ether-containing polymer in component (i) and preferably contains no hydrogen bond donating groups. The modifying agent functions to favorably modify the physical properties of the polymer blend material, generally by improving the ultimate elongational (i.e., toughness) characteristics of the polymer blend material. In a first embodiment, only carbon particles are selected as a modifying agent (i.e., ether-containing polymers and Lewis acid compounds are excluded). In a second embodiment, only an ether-containing polymer is selected as a modifying agent (i.e., carbon particles and Lewis acid compounds are excluded). In the latter embodiment, the polymer of component (ii) is selected from other than an ether-containing polymer, while the polymer of component (i) may or may not include ether groups along with the hydrogen bond donating groups. In a third embodiment, only a Lewis acid compound is selected as a modifying agent (i.e., carbon particles and ether-containing polymers are excluded). In a fourth embodiment, a combination of carbon particles with an ether-containing polymer is selected as the modifying agent. In a fifth embodiment, a combination of carbon particles with a Lewis acid compound is selected as the modifying agent. In a sixth embodiment, a combination of an ether-containing polymer and a Lewis acid compound is selected as the modifying agent. In a seventh embodiment, a combination of carbon particles, an ether-containing polymer, and a Lewis acid compound is selected as the modifying agent.

The carbon particles can be any of the carbon particles known in the art that are composed at least partly or completely of elemental carbon, and may be conductive, semiconductive, or non-conductive. The carbon particles may be nanoparticles (e.g., at least 1, 2, 5, or 10 nm, and up to 20, 50, 100, 200, or 500 nm), microparticles (e.g., at least 1, 2, 5, or 10 µm and up to 20, 50, 100, 200, or 500 µm), or macroparticles (e.g., above 500 µm, or at least or up to 1, 2, 5, 10, 20, 50, or 100 mm). Some examples of carbon particles include carbon black ("CB"), carbon onion ("CO"), a spherical fullerene (e.g., buckminsterfullerene, i.e., $C_{60}$, as well as any of the smaller or larger buckyballs, such as $C_{20}$ or $C_{70}$), a tubular fullerene (e.g., single-walled, double-walled, or multi-walled carbon nanotubes), carbon nanodiamonds, and carbon nanobuds, all of which have compositions and physical and electrical properties well-known in the art. As known in the art, fully graphitized carbon nanodiamonds can be considered to be carbon onions.

In some embodiments, the carbon particles are made exclusively of carbon, while in other embodiments, the carbon particles can include an amount of one or a combination of non-carbon non-hydrogen (i.e., hetero-dopant) elements, such as nitrogen, oxygen, sulfur, boron, silicon, phosphorus, or a metal, such as an alkali metal (e.g., lithium), alkaline earth metal, transition metal, main group metal (e.g., Al, Ga, or In), or rare earth metal. Some examples of binary carbon compositions include silicon carbide (SiC) and tungsten carbide (WC). The amount of hetero element can be a minor amount (e.g., up to 0.1, 0.5, 1, 2, or 5 wt % or mol %) or a more substantial amount (e.g., about, at least, or up to 10, 15, 20, 25, 30, 40, or 50 wt % or mol %). In some embodiments, any one or more of the specifically recited classes or specific types of carbon particles or any one or more of the specifically recited classes or specific types of hetero-dopant elements are excluded from the carbon particles.

In some embodiments, the carbon particles can be any of the high strength carbon fiber compositions known in the art. As known in the art, the carbon fiber has its length dimension longer than its width dimension. Some examples of carbon fiber compositions include those produced by the pyrolysis of polyacrylonitrile (PAN), viscose, rayon, pitch, lignin, polyolefins, as well as vapor grown carbon nanofibers, single-walled and multi-walled carbon nanotubes, any of which may or may not be heteroatom-doped, such as with nitrogen, boron, oxygen, sulfur, or phosphorus. The carbon particles may also be two-dimensional carbon materials, such as graphene, graphene oxide, or graphene nanoribbons, which may be derived from, for example, natural graphite, carbon fibers, carbon nanofibers, single walled carbon nanotubes and multi-walled carbon nanotubes. The carbon fiber typically possesses a high tensile strength, such as at least 500, 1000, 2000, 3000, 5000, 7,000, 10,000 or 20,000 MPa, with a degree of stiffness generally of the order of steel or higher (e.g., 100-1000 GPa).

The Lewis acid compound can be any of the compounds known in the art having Lewis acid character, i.e., strongly electrophilic by virtue of a deficiency of electrons. Some examples of Lewis acid compounds include boron-containing compounds (e.g., boric acid, borates, borate esters, boranes, and boron halides, such as $BF_3$, $BCl_3$, and $BBr_3$), aluminum-containing compounds (e.g., aluminum hydroxide, aluminates, aluminate esters, and aluminum halides, such as $AlF_3$, $AlCl_3$, and $AlBr_3$), and tin-containing compounds (e.g., stannic acid, tin esters (e.g., tin(II) acetate or tin(II) 2-ethylhexanoate), tin alkoxides (e.g., tin(IV) ethoxide), and tin halides, such as $SnF_4$, $SnCl_4$, $SnBr_4$, and $SnI_4$). The Lewis acid compound is preferably not adversely reactive with either of the two polymer components (i) and (ii), or other components of the composition, to the extent that the polymer blend material is not improved in its physical properties relative to when the Lewis acid compound is absent.

The polymer blend material may or may not further include a metal oxide composition as an additional modifying agent. The metal of the metal oxide composition can be, for example, an alkali metal, alkaline earth metal, main group metal, transition metal, or lanthanide metal. Some examples of alkali metal oxides include $Li_2O$, $Na_2O$, $K_2O$, and $Rb_2O$. Some examples of alkaline earth metal oxide compositions include BeO, MgO, CaO, and SrO. Some examples of main group metal oxide compositions include $B_2O_3$, $Ga_2O_3$, SnO, $SnO_2$, PbO, $PbO_2$, $Sb_2O_3$, $Sb_2O_5$, and $Bi_2O_3$. Some examples of transition metal oxide compositions include $Sc_2O_3$, $TiO_2$, $Cr_2O_3$, $Fe_2O_3$, $Fe_3O_4$, FeO, $Co_2O_3$, $Ni_2O_3$, CuO, $Cu_2O$, ZnO, $Y_2O_3$, $ZrO_2$, $NbO_2$, $Nb_2O_5$, $RuO_2$, PdO, $Ag_2O$, CdO, $HfO_2$, $Ta_2O_5$, $WO_2$, and $PtO_2$. Some examples of lanthanide metal oxide composition include $La_2O_3$, $Ce_2O_3$, and $CeO_2$. In some embodiments, any one or more classes or specific types of the foregoing metal oxides are excluded from the polymer blend.

The amount (i.e., weight percent, or "wt %") of modifying agent with respect to the weight sum of components (i), (ii), and (iii) or with respect to the weight of the final polymer blend can be any suitable amount, but typically no more than about 10, 15, 20, 25, or 30 wt %. In different embodiments, the modifying agent can be in an amount of precisely, about, at least, up to, or less than, for example, 1 wt %, 2 wt %, 3 wt %, 4 wt %, 5 wt %, 10 wt %, 12 wt %, 15 wt %, 20 wt %, 25 wt %, or 30 wt %, or in an amount within a range bounded by any two of the foregoing values.

The polymer blend material containing at least components (i), (ii), and (iii) preferably possesses a tensile strength of at least or above 1 MPa, when the composition is free from solvents or not substantially solvated, and more preferably at least or above 10, 15, 20, or 30 MPa. In different embodiments, the polymer blend material may exhibit a tensile strength of at least or above 1 MPa, 2, MPa, 3 MPa, 4 MPa, 5 MPa, 10 MPa, 12 MPa, 15 MPa, 20 MPa, 25 MPa, 30 MPa, 35 MPa, 40 MPa, 45 MPa, 50 MPa, 60 MPa, 70 MPa, 80 MPa, 90 MPa, 100 MPa, 200 MPa, 300 MPa, 400 MPa, 500 MPa, 600 MPa, 700 MPa, 800 MPa, 900 MPa, or 1000 MPa, or a tensile strength within a range bounded by any two of the foregoing exemplary values.

The polymer blend material containing at least components (i), (ii), and (iii) preferably possesses an elongation of at least or above 5%, and more preferably at least or above 10%, 20%, 30%, 40%, or 50%. In different embodiments, the polymer blend material may exhibit an elongation of at least or greater than 5%, 10%, 15%, 20%, 30%, 40%, 50%, 60%, 70%, 80%, 90%, 100%, 110%, 120%, 150%, 180%, 200%, 250%, 300%, 400%, or 500%, or an elongation within a range bounded by any two of the foregoing exemplary values. In some embodiments, the polymer blend exhibits at least or greater than 1000%, 1500%, 2000%, or even 2500% elongation.

In another aspect, the instant disclosure is directed to methods for producing the polymer blend material described above. In the method, the components (i), (ii), and (iii) are mixed and homogeneously blended to form the polymer blend material. Any one of the components (i), (ii), and/or (iii) can be included in liquid form (if applicable), in solution form, or in particulate form. In the case of particles, the particles may be, independently, nanoparticles (e.g., at least 1, 2, 5, or 10 nm, and up to 20, 50, 100, 200, or 500 nm), microparticles (e.g., at least 1, 2, 5, or 10 μm, and up to 20, 50, 100, 200, or 500 μm), or macroparticles (e.g., above 500 μm, or at least or up to 1, 2, 5, 25, 50, or 100 mm). Typically, if any of the components (i)-(iii) is provided in particle form, the polymeric particles are melted or softened by appropriate heating to permit homogeneous blending of polymers and uniform dispersion of particles. The components can be homogeneously blended by any of the methodologies known in the art for achieving homogeneous blends of solid, semi-solid, gel, paste, or liquid mixtures. Some examples of applicable blending processes include simple or high speed mixing, compounding, extrusion, or ball mixing, all of which are well-known in the art.

By being "homogeneously blended" is meant that, in macro (e.g., millimeter) scale, no discernible regions of at least components (i) and (ii) exist, although discernible regions of component (iii) may or may not exist. Some of the phase (iii) component remains as solid phase, either in elemental state (e.g., carbon particles) or in crystalline lamella phase (e.g., polyethylene oxide). In other words, the homogeneous blend possesses a modified or compatibilized phase structure (not necessarily a single phase structure, but often with retained but shifted $T_g$ associated with individual phases) for at least components (i) and (ii). The modified-phase structure generally indicates near homogeneous integration at micro-scale or near the molecular level without losing each component's identity. A component other than component (i), (ii), or (iii) may be present in homogeneous or non-homogeneous form. In the case of an additional non-homogeneous component, the instantly described polymer blend having components (i), (ii), and (iii) can be considered a "homogeneous matrix" in which the additional non-homogeneous component is incorporated. Preferably, all of the components retain their segmental identity and components are well dispersed in the nanometer scale. In that case, component (i) may provide rigidity or high $T_g$, phase; component (ii) may provide flexibility, elasticity, and low $T_g$; and component (iii) may provide some degree of synergy in the interaction between phases (i) and (ii), thereby functioning as an interfacial adhesion promoter and/or materials performance enhancer. In some embodiments, if components (i) and (ii) form a completely miscible phase, they would exhibit a single $T_g$.

In some embodiments, the mixture being blended further includes a radical crosslinking agent. The radical crosslinking agent is any substance that produces radicals to effect crosslinking of component (i) and/or (ii) either during the blending process and/or subsequently during a conditioning process, activation process, curing process, and/or shape-forming process. Typically, the radical crosslinking agent decomposes under thermal or radiative exposure to form reactive radicals. The radical crosslinking agent may be, for example, any of the radical polymerization initiators known in the art. In particular embodiments, the radical crosslinking agent is an organic peroxide compound. Some examples of organic peroxide compounds include dicumyl peroxide (DCP), t-butyl peroxide, benzoyl peroxide, methyl ethyl ketone peroxide, and acetone peroxide. The radical crosslinking agent may alternatively be an inorganic peroxide compound, such as a peroxydisulfate salt. The radical crosslinking agent may or may not also be selected from non-peroxide radical-producing compounds, such as azo compounds (e.g., AIBN or ABCN) or a halogen (e.g., $Br_2$ or $I_2$). In some embodiments, radical crosslinking may be achieved by physical means, such as by exposure of the material to electron beam (e.g., Stelescu et al., *The Scientific World Journal*, 684047, 2014) or ultraviolet (UV) radiation (e.g., Naskar et al., *Carbon*, 43(5) 1065-1072, 2005) that generates free radicals for crosslinking of the components. Hydrocarbon polymers generate free radicals by exposure to electron beam radiation. In some embodiments, to facilitate UV crosslinking, the polymer blend may be further modified with acrylates and/or conjugated ketones (benzophenone derivatives) additives that generate free radicals when exposed to UV radiation.

The polymer blend material is typically subjected to a shape-forming process to produce a desired shape of the polymer blend. The shape-forming process can include, for example, molding (e.g., pour, injection, or compression molding), extrusion, melt-spinning, melt pressing, or stamping, all of which are well known in the art.

In still other aspects, the invention is directed to an article containing the polymer blend described above. The article is typically one in which some degree of toughness is desired along with high mechanical strength. The blend can be further reinforced with, for example, continuous carbon, ceramic, or metallic fibers to produce composite parts. The article may be used as or included in any useful component, such as a structural support, the interior or exterior of an automobile, furniture, a tool or utensil, or a high strength sheet or plate. In some embodiments, the polymer blend may be produced and applied as a coating or film, such as a protective film. The polymer blend may be rendered as a coating or film by, for example, melting the blend or dissolving the components of the blend in a suitable solvent, followed by application of the liquid onto a suitable substrate and then solvent removal. If the polymer blend possesses a suitably substantial degree of elasticity, the polymer blend may also function as a binding agent, adhesive, or dispersing agent.

Examples have been set forth below for the purpose of illustration and to describe certain specific embodiments of the invention. However, the scope of this invention is not to be in any way limited by the examples set forth herein.

Example 1

Production of Polymer Blends with a Metal Oxide as Modifier

Comparative

Part 1: Reactive Synthesis of Materials in CW Brabender 3-Piece Mixer

Mixing run 1: The mix compositions are shown in the first column of Table 1. The mixer was preheated at a temperature set to 60° C. The rotor was set at a speed of 60 rpm, and the run time was set for 9 minutes. The mixing run began once the mixer reached the desired temperature, which first overshot and then cooled back down to 60° C. Then the nitrile rubber sample was added, and the rubber allowed to soften for two minutes, after which ZnO was immediately added. The mixture was blended for two minutes, followed by immediate addition of 1 pphr (parts per hundred parts of rubber) loading of DCP. The mixture was allowed to mix for five minutes. The sample was then recovered and stored at room temperature until the second mixing run.

Mixing run 2: The temperature was set to 140° C., speed set at 60 rpm, and run time set for 6 minutes. The mixing run began once the mixer reached the desired temperature, which first overshot and then cooled back down to 140° C. Then the softwood Kraft lignin sample was added, and the lignin allowed to melt for 1 minute, after which the rubber sample from mixing run 1 was added. The mixture was run for five minutes, and the sample recovered and stored at room temperature until molding.

Part 2: Molding of Resin Sample into Sheets

The mixed sample material was inserted into the compression mold to produce a molded sheet. The plates of the mold were heated to 150° C. (302° F.). Once temperature was reached, the plates were firmly pressed, but without registered pressure, for 10 seconds, and then released. Then the plates were pressed to 5 metric tons of pressure for 10 seconds, and released. Finally, the plates were pressed to 5 metric tons of pressure and held for 10 minutes. At 10 minutes, the heating plates were cooled with cooling water. The cooling was conducted for ten minutes before releasing the remaining pressure and retrieving the sample sheet. The sheet was carefully stored before using it to cut out dumbbells. The results are provided in Table 1 below.

TABLE 1

| Sample Make Up | Tensile Strength (MPa) | Strain At Break (%) | Stress @ 100% Strain (MPa) | Stress @ 300% Strain (MPa) |
|---|---|---|---|---|
| 40 g/60 g/5 pphr/1 pphr NBR/Lignin/ZnO/DCP | 1.4 | 551.5 | 1.315 | 1.313 |
| 30 g/70 g/15 pphr/1 pphr NBR/Lignin/ZnO/DCP | 1.3 | 2.646 | 0.539 | no data |
| 50 g/50 g/5 pphr/1 pphr NBR/Lignin/ZnO/DCP | 1.2 | 794.9 | 0.867 | 1.147 |
| 100 g/5 pphr/1 pphr NBR/ZnO/DCP | 1.1 | 843.2 | 0.942 | 1.12 |

From the data in Table 1, the formulation under study could replace nitrile rubber by 60% with lignin with little improvement in tensile strength and modulus while maintaining >500% elongation at break. These results were encouraging, but the formulation was lacking, particularly in tensile strength (i.e., peak stress).

Example 2

Production of Polymer Blends with Boric Acid as Modifier

Part 1: Reactive Synthesis of Materials in CW Brabender 3-Piece Mixer

The blend compositions are shown in the first column of Table 2. In this experiment, the earlier Mixing run 1 was avoided with a plan to double the DCP loading assuming 50% of the DCP will go to the lignin phase that will act as free radical scavenger and bond to the rubber by quenching reaction.

The mixer was preheated at a temperature set to 140° C. The rotor speed was set at 60 rpm. The mixing run began once the mixer reached the desired temperature, which first overshot then cooled back down to 140° C. Then the softwood Kraft lignin was added, and the lignin allowed to shear for two minutes, after which the raw nitrile rubber was gradually added. The mixture was blended for 6 minutes, after which 3 wt % of boric acid (with respect to total rubber+lignin mass) was added. Then the mixture was blended for 4 minutes, after which 2 phr of DCP was added. The mixture was then blended for 10 minutes, and the sample recovered and stored at room temperature until molding.

Part 2: Molding of Resin Sample into Sheets

The mixed sample material was inserted into the compression mold to produce a molded sheet. The plates of the mold were heated to 185° C. (365° F.). Once temperature was reached, the plates were firmly pressed, but without registered pressure, for 10 seconds, and then released. Then the plates were pressed to 5 metric tons of pressure for 10 seconds, and released. Finally, the plates were pressed to 5 metric tons of pressure and held for 10 minutes. At 10 minutes, the heating plates were cooled with cooling water. The cooling was conducted for ten minutes before releasing the remaining pressure and retrieving the sample sheet. The sheet was carefully stored before using it to cut out dumbbells. For another molded specimen from the same material, the molding time was kept to 30 minutes before cooling was initiated. The results of the two samples are provided in Table 2 below.

TABLE 2

| Sample Make Up | Tensile Strength (MPa) | Strain At Break (%) | Stress @ 100% Strain (MPa) | Stress @ 300% Strain (MPa) |
|---|---|---|---|---|
| 50 g/50 g/3 g/2 pphr NBR/Lignin/Boric acid/DCP (30 min press) | 4.02 | 384.6 | 2.158 | 3.947 |
| 50 g/50 g/3 g/2 pphr NBR/Lignin/Boric acid/DCP (10 min press) | 3.51 | 364.7 | 2.12 | 3.494 |

The above results show that the use of boric acid in place of ZnO improved the tensile strength by more than double. Moreover, the ultimate elongation further dropped to the 300-400% level. The results also show that longer molding time improved the properties. Either increasing crosslinking or annealing also helped to enhance the properties. The results were encouraging, but efforts were made to further improve the formulation, particularly in tensile strength while maintaining good elongation.

Example 3

Production of Polymer Blends with Boric Acid and Carbon Black as Modifier

Part 1: Reactive Synthesis of Materials in CW Brabender 3-Piece Mixer

The protocols of Examples 1 and 2 were followed. In this experiment, the DCP loading was further increased along with addition of 20 pphr carbon black. Also, in this set of experiments, the type of rubber material was altered to better understand the effect of the rubber type on the mechanical properties of the blend. Other than nitrile rubber or acrylonitrile-butadiene rubber (NBR), other rubbers, such as natural rubber (NR), styrene-butadiene rubber (SBR), butadiene rubber (BR), and brominated isobutylene paramethyl-styrene terpolymers (Exxpro™-3433) were used in different formulations.

Mixing run 1: The mixer was preheated at a temperature set to 140° C. The rotor speed was set at 30 rpm. The mixing run began once the mixer reached the desired temperature, which first overshot then cooled back down to 140° C. Then the rubber was added, and the rubber sheared for two minutes, after which the carbon black was gradually added. The mixture was blended for 7 minutes, after which the mixing was stopped and the rubber mix removed and cooled.

Mixing run 2: The mixer was preheated at a temperature set to 140° C. Then the lignin was added and allowed to melt and shear for two minutes, after which the rubber black mix was added into the sheared lignin. The mixture was blended for six additional minutes. Then 3 wt % of boric acid (with respect to total rubber+lignin mass) was added. Then the mixture was blended for 4 minutes, after which 4.2 phr of DCP was added. The mixture was then blended for 10 minutes, and the sample recovered and stored at room temperature until molding. In another sample with nitrile rubber, 4.8 pphr DCP was used.

Part 2: Molding of Resin Sample into Sheets

The mixed sample material was inserted into the compression mold to produce a molded sheet. The plates of the mold were heated to 185° C. (374° F.). Once temperature was reached, the plates were firmly pressed, but without registered pressure, for 10 seconds, and then released. Then the plates were pressed to 5 metric tons of pressure for 10 seconds, and released. Finally, the plates were pressed to 5 metric tons of pressure and held for 30 minutes. At 30 minutes, the heating plates were turned off and cooled with cooling water. The cooling was conducted for ten minutes before releasing the remaining pressure and retrieving the sample sheet. The sheet was carefully stored before using it to make dog bones. The results are provided in Table 3 below.

TABLE 3

| Sample Make Up | Tensile Strength (MPa) | Strain At Break (%) | Stress @ 100% Strain (MPa) | Stress @ 300% Strain (MPa) |
|---|---|---|---|---|
| 44 g/52.8 g/20 pphr/3.2 g/4.8 pphr NBR/Lignin/CB/Boric acid/DCP | 6.39 | 239.6 | 5.297 | 5.905 |
| 48.4 g/48.4 g/20 pphr/3.2 g/4.2 pphr NBR/Lignin/CB/Boric/DCP | 5.54 | 309.9 | 3.209 | 5.568 |
| 44 g/52.8 g/20 pphr/3.2 g/4.8 pphr Expro3433/Lignin/CB/Boric/DCP | 3.34 | 99.77 | 2.868 | no data |
| 44 g/52.8 g/20 pphr/3.2 g/4.8 pphr SBR/Lignin/CB/Boric/DCP | 3.00 | 69.02 | 0.918 | no data |
| 44 g/52.8 g/20 pphr/3.2 g/4.8 pphr BR/Lignin/CB/Boric/DCP | 1.77 | 37.61 | no data | no data |
| 44 g/52.8 g/20 pphr/3.2 g/4.8 pphr NR/Lignin/CB/Boric/DCP | 1.56 | 86.58 | 1.368 | no data |

Figure 2:
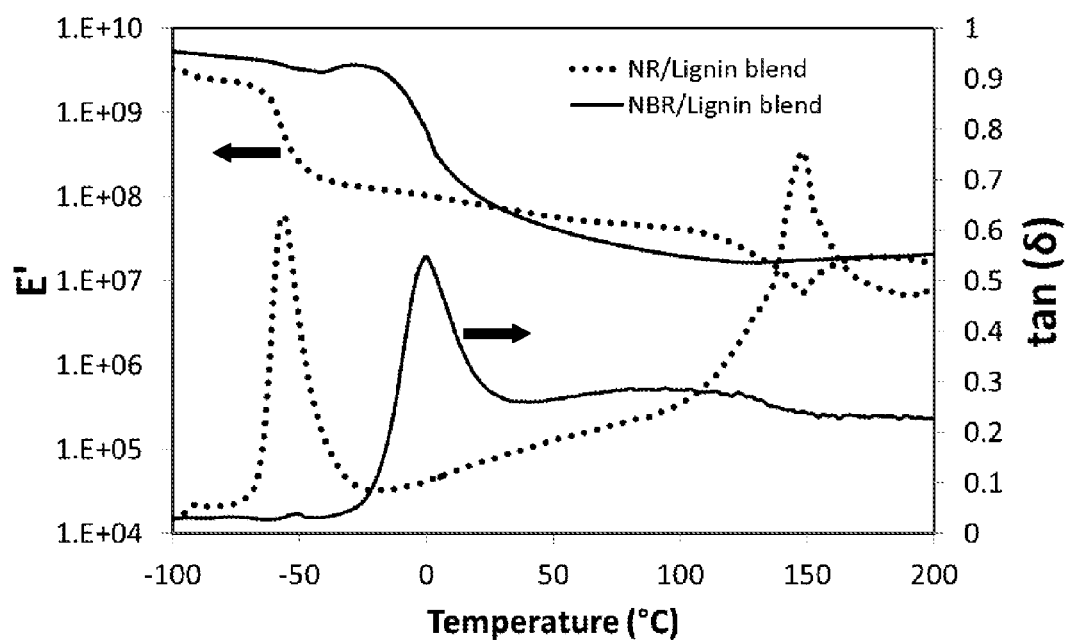
FIG. 2. Representative dynamic mechanical storage modulus and loss tangent spectra for softwood lignin-natural rubber and softwood lignin-nitrile rubber blends containing carbon black, boric acid, and crosslinked in presence of dicumyl peroxide.

The above results show that use of carbon black improves the tensile strength of the blend from 4 MPa to 6.4 MPa (60% improvement), with the ultimate elongation at the 200-300% level. The variation of rubber composition suggests higher degree of compatibility with NBR than any other rubbers. Bromobutyl rubber or SBR could be good if the DCP loading can be optimized, but BR and NR are largely incompatible to the lignin melt. Based on this result, it may be hypothesized that the potential interfacial interaction between NBR and lignin phases can be further improved by be selection of other additives. The dynamic mechanical storage modulus and loss tangent spectra for representative lignin blends containing NR and NBR are shown in FIG. 2. The storage modulus value drops with increase in temperature. At the glass transition temperature, the drop in storage modulus is high. The loss tangent (tan($\delta$)) value, which is the ratio of loss to storage moduli, shows a maxima at the $T_g$. It is apparent from FIG. 2 that the blend containing NR/lignin has two distinct $T_g$s associated with rubber (−56° C.) and lignin (148° C.) phases. However, for the NBR/lignin blend, the lignin $T_g$ does not appear that prominent in the loss tangent spectrum. The shifted NBR $T_g$ appears at 0° C. and a shoulder appears due to a homogenous lignin-rubber modified phase in the 60-130° C. temperature range. The NBR/lignin blend does not show a drop in storage modulus beyond 100° C. The blend containing Exxpro™-3433 (bromobutyl rubber) shows slightly better properties than the NR, SBR, or BR containing blends.

Example 4

Lignin/PEO Blends with Boric Acid Incorporated Therein

Two types of lignins were used: hardwood organosolv (HW) and softwood (SW) Kraft lignin. 60 g of lignin was mixed with 40 g polyethylene oxide (PEO, molecular weight 5,000,000). In two of the formulations, 10 g of boric acid was added to the lignin-PEO blend. The compositions are shown in Table 4 below. The formulations were prepared as follows: A half-sized Brabender Intelli-Torque Palsti-Corder was preheated to 140° C., and the lignin added to the mixing chamber. Hardwood lignin became a molten fluid, whereas the softwood remained a granular powder. After two minutes of shear at 50 rpm, the PEO was added. When boric acid was included, it was added after four minutes of total mixing time. The molten mix was removed after a total of 12 minutes of mixing. The material was compression molded at 190° C. in between Teflon sheets. Tensile testing was performed following the ASTM D882 method in a MTS Alliance RT/5 device equipped with a 5N load cell at 0.5 inch per minute strain rate. Dumbbell specimens for the tensile tests were cut from molded sheets using a die (ASTM D-638-5-1MP). Mechanical properties and thermal characteristics of the compositions are summarized in Table 4 below.

TABLE 4

Composition and properties of lignin/PEO blends

| Blend | Composition | | | Tensile data | | | Thermal characteristics* | |
|---|---|---|---|---|---|---|---|---|
| | PEO (g) | Lignin (g) | Boric acid (g) | Yield stress, ksi (MPa) | Maximum stress, ksi (MPa) | Ultimate elongation (%) | $T_g$ (° C.) | $T_m$ (° C.) |
| PEO | 100 | — | — | 2.6 (17.5) | 3.7 (25.8) | 760 | −53 | 70 |
| HW/PEO | 40 | 60 | — | 4.3 (29.3) | 4.3 (29.3) | 6 | −7 | 59 |
| SW/PEO | 40 | 60 | — | 4.9 (33.7) | 4.9 (33.7) | 20 | −1 | 59 |
| HW/PEO/BA | 40 | 60 | 10 | 4.1 (28.7) | 4.1 (28.7) | 25 | −12 | 58 |
| SW/PEO/BA | 40 | 60 | 10 | 2.6 (17.9) | 2.6 (17.9) | 120 | −7 | 59 |

*$T_g$ data from second heating cycle at 10° C./min scan rate and melting peak from first heating cycle at 10° C./min scan rate in DSC runs.

Figure 3A:
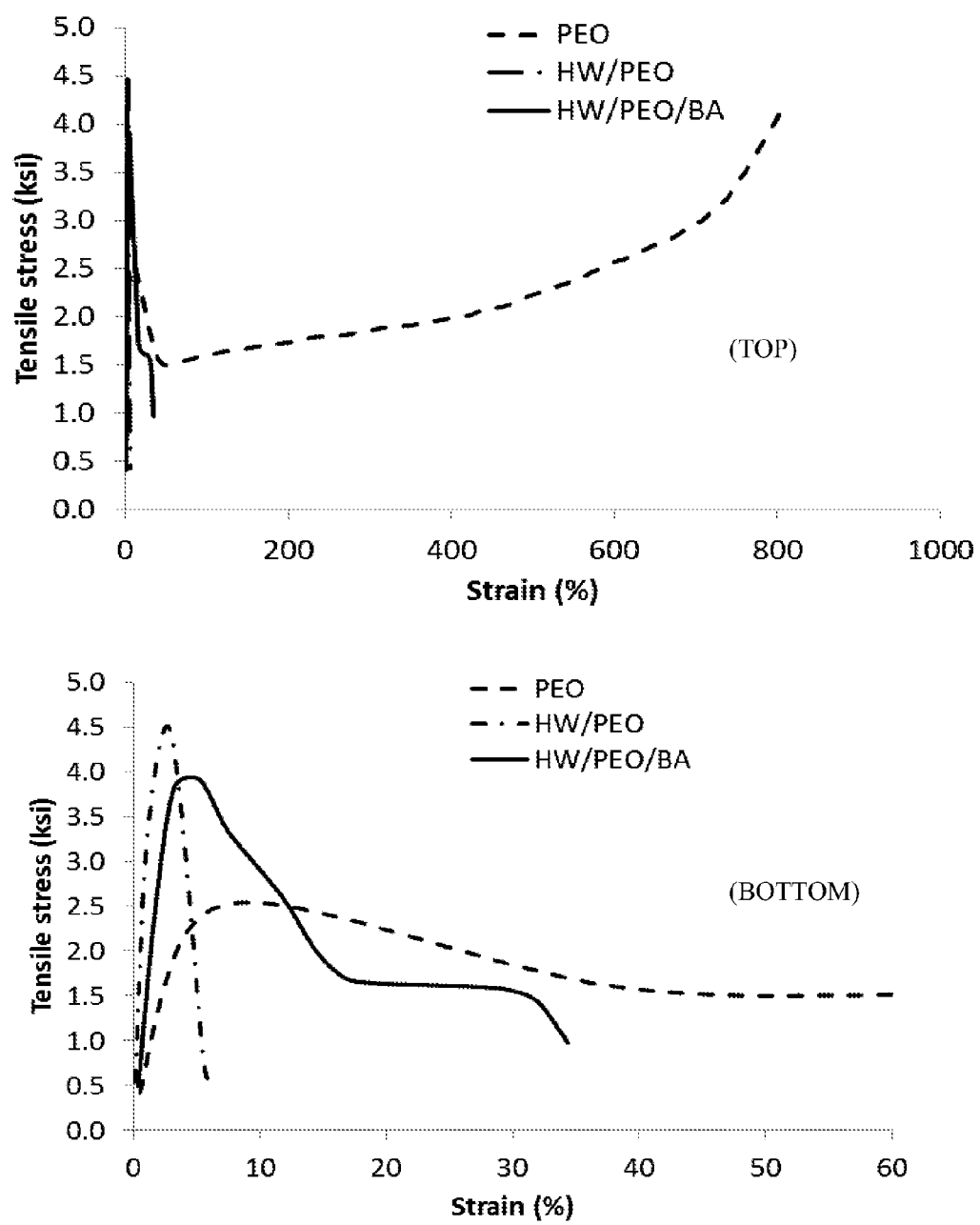
FIGS. 3A (top, bottom), 3B (top, bottom). For FIG. 3A: Representative tensile stress-strain profiles of hardwood (HW) lignin-PEO blends up to strain of 1000% (FIG. 3A, top), along with expanded portion of strain axis up to 60% (FIG. 3A, bottom). For FIG. 3B: Representative tensile stress-strain profiles of softwood (SW) lignin-PEO blends up to strain of 1000%, with and without incorporation of boric acid (BA), as well as control curve for only PEO (FIG. 3B, top), along with expanded portion of strain axis up to 200% (FIG. 3B, bottom).
Figure 3B:
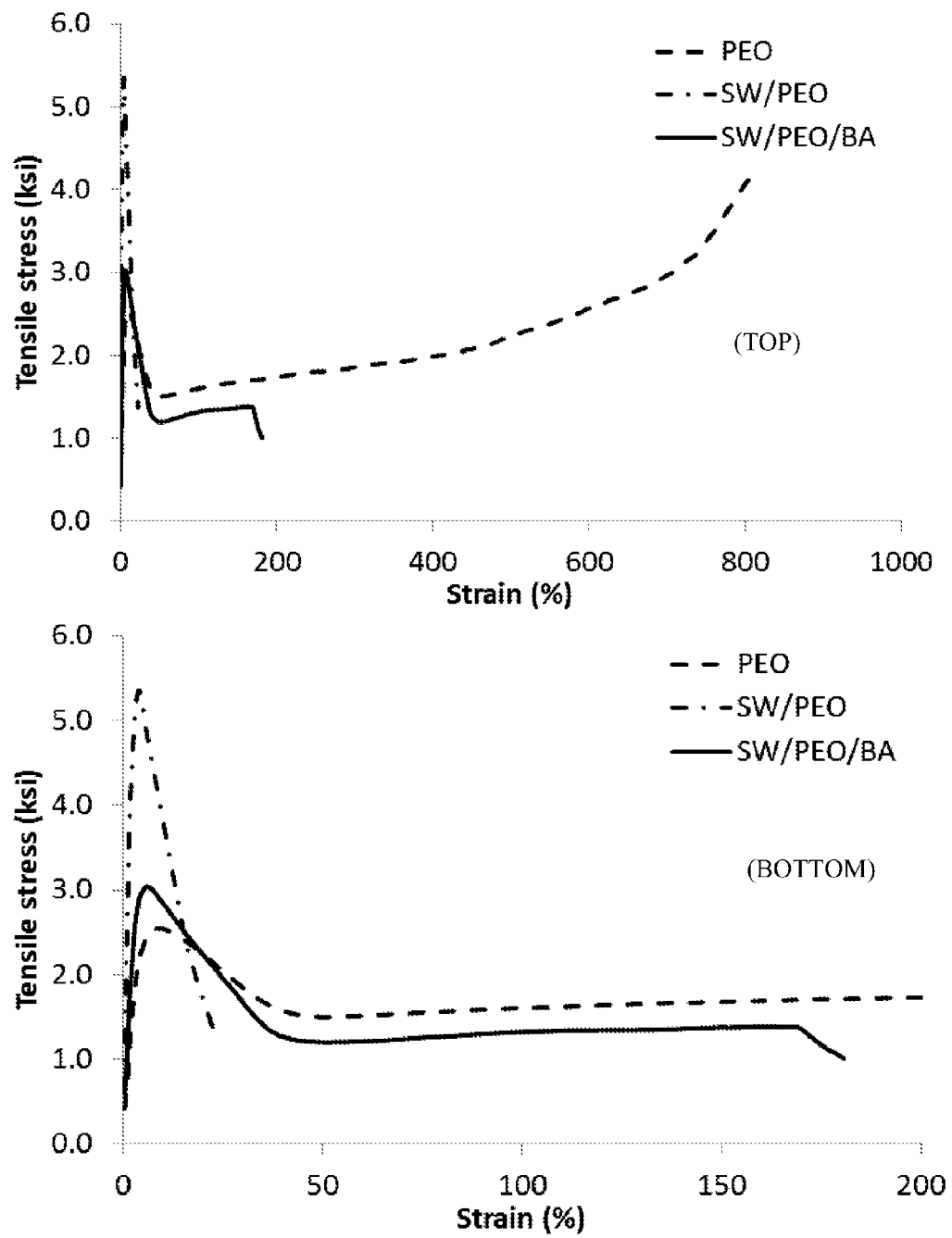

Lignin forms a miscible blend by mixing with polyethylene oxide. However, the blend remains very brittle with extensive hydrogen bonding resulting in a single phase glass transition temperature ($T_g$). Incorporation of boric acid lowers the $T_g$ of the blend and permits little improvement in ductility. The tensile stress-strain plots are shown in FIGS. 3A and 3B, which show representative tensile stress-strain profiles of the hardwood (HW) lignin-PEO blends (FIG. 3A) and softwood (SW) lignin-PEO blends (FIG. 3B), with and without incorporation of boric acid (BA), as well as control curve for only PEO.

From these results, it is clear that lignin and PEO strongly interact, and the miscible mix has a higher yield stress than the neat PEO. Softwood lignin, being more rigid in nature, exhibits higher yield stress than the hardwood lignin in a PEO matrix. Incorporation of BA lowers the PEO/lignin interaction (hydrogen bonding) as boric acid promotes condensation with some of the hydroxyl groups in lignin. The reduction in yield stress is dominant in the softwood lignin/PEO blend, which suggests an unexpected stronger reaction between boric acid and softwood lignin compared to that of hardwood lignin and boric acid. The softwood lignin, PEO, and boric acid admixture also shows a high elongation at break (120%) among all the lignin containing PEO blends.

Example 5

Toughened Lignin-Nitrile Rubber Blends and Effects of Different Additives

Hardwood (HW) and softwood (SW) lignins were mixed with acrylonitrile-butadiene rubber (NBR). The rubber phase of the blends was crosslinked by organic peroxides. In some compositions, the rubber phase was reinforced with carbon black, and lignin was complexed with boric acid. In some cases, the compositions were further modified with PEO with an aim to enhance the yield stress as observed in Example 4. The compositions are shown in Table 5 below. The formulations were prepared as follows: A half-sized Brabender Intelli-Torque Palsti-Corder was preheated to 140° C. Rubber was masticated for 2 minutes followed by addition of carbon black. The rubber and black were mixed for 5 minutes, then taken out of the mixer. Lignin was added to the mixing chamber maintained at 140° C. Hardwood lignin became a molten fluid, but the softwood lignin remained a granular powder. After two minutes of shear at 50 rpm, PEO was added. After three minutes of mixing the lignin and PEO, carbon black loaded rubber (premixed) was added and mixed for additional six minutes. Then boric acid was added, followed by mixing for an additional four minutes. At that point, dicumyl peroxide was added and mixed until a uniform torque was reached. In some compositions where specific additive loading was skipped, they followed the same sequence without addition of such ingredients and mixing times were more or less similar. The melt-mixed material was removed from the mixing chamber when it was hot.

TABLE 5

Composition and properties of lignin/NBR blends

| Blend | Composition | | | | | Tensile data | | | Thermal characteristics* | |
|---|---|---|---|---|---|---|---|---|---|---|
| | NBR (g) | Lignin (g) | PEO (g) | DCP (g) | BA (g) | Yield stress, (MPa) | Maximum stress, ksi (MPa) | Ultimate strain (%) | $T_g(1)$ (°C.) | $T_g(2)$ (°C.) |
| SW/NBR | 100 | 120 | — | — | — | — | 0.6 (3.8 ± 0.4) | 526 ± 96 | −22 | 152 |
| SW/NBR/DCP | 100 | 120 | — | 2.4 | — | — | 1.3 (8.8 ± 1.6) | 126 ± 35 | −18 | 170 |
| SW/NBR/BA/DCP | 100 | 120 | — | 2.4 | 7.2 | — | 1.2 (8.1 ± 0.8) | 133 ± 23 | −22 | 169 |
| SW/NBR/PEO | 100 | 120 | 20 | — | — | — | 0.5 (3.2 ± 0.3) | 352 ± 56 | NA | NA |
| SW/NBR/PEO/DCP | 100 | 120 | 20 | 2.4 | — | — | 0.8 (5.3 ± 0.6) | 105 ± 37 | NA | NA |
| SW/NBR/BA/PEO/DCP | 100 | 120 | 20 | 2.4 | 7.2 | — | 0.9 (6.3 ± 0.2) | 146 ± 16 | −22 | 170 |
| HW/NBR | 100 | 120 | — | — | — | — | 0.2 (1.3 ± 0.1) | >2500 | −20 | 150 |
| HW/NBR/DCP | 100 | 120 | — | 2.4 | — | — | 0.7 (4.6 ± 0.8) | 226 ± 80 | −17 | 157 |
| HW/NBR/BA/DCP | 100 | 120 | — | 2.4 | 7.2 | — | 0.9 (6.4 ± 1.1) | 229 ± 69 | NA | NA |
| HW/NBR/PEO | 100 | 120 | 20 | — | — | 2.6 ± 0.3 | 0.4 (2.6 ± 0.3) | 155 ± 75 | NA | NA |
| HW/NBR/PEO/DCP | 100 | 120 | 20 | 2.4 | — | 3.7 ± 0.4 | 0.5 (3.7 ± 0.4) | 169 ± 78 | NA | NA |
| HW/NBR/BA/PEO/DCP | 100 | 120 | 20 | 2.4 | 7.2 | 3.5 ± 0.5 | 0.5 (3.5 ± 0.4) | 170 ± 55 | −21 | 113 |

*Tg data from second heating cycle at 10° C./min scan rate from DSC runs for soft rubbery phase (1) and hard lignin phase (2); NA = not analyzed.

The melt-mixed formulations were compression molded at 190° C. in between Teflon sheets at 9 ton pressure and then cooled under pressure. Tensile testing was performed following the ASTM D882 method in a MTS Alliance RT/5 equipped with a 5N load cell at 0.5 inch per minute strain rate. Dumbbell specimens for the tensile tests were cut from molded sheets using a die (ASTM D-638-5-1MP). Thermal analysis was conducted on molded specimens in a differential scanning calorimeter scanned at 10° C./min.

Binary, Ternary, Quaternary, and Quinary Blends without CB Loading

The compositions shown in Table 5 were studied to understand the effect of DCP in lignin/NBR blends both in the presence or absence of PEO. The properties are summarized in Table 5. The results show that the SW/NBR blend is stronger than the HW/NBR blend. This is likely due to a higher degree of rigidity of SW lignin molecules. Crosslinking of NBR by dicumyl peroxide enhances the properties of the blends. NBR/HW/PEO blends exhibit a yield stress characteristic of PEO. As evident from the visible yield stress, the PEO likely remains as a separate or excluded phase (in NBR/HW/PEO). However, such yield stress is not clearly visible in the SW/NBR/PEO mix. Plasticization and softening of the SW/NBR blend by PEO is also evident from the table data. The PEO plasticization effect is dominant in the DCP-cured SW/NBR blend. Such plasticization effect of the PEO phase in DCP-crosslinked HW/NBR is not prevailing.

Figure 4A:
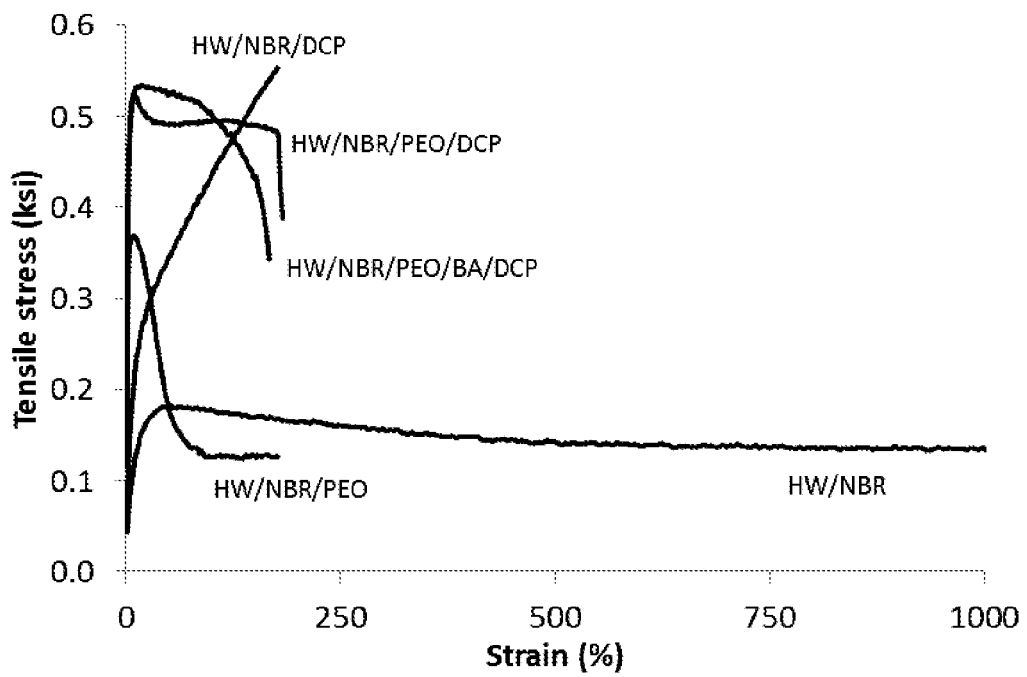
FIGS. 4A, 4B. Representative tensile stress-strain profiles of hardwood (HW) lignin-NBR blends with PEO and/or BA (FIG. 4A) and softwood (SW) lignin-NBR blends with PEO and/or BA (FIG. 4B), with or without DCP, as well as control curves for blends containing only lignin and NBR, with or without DCP (where "NBR" refers to nitrile butadiene rubber, and "DCP" refers to dicumyl peroxide).
Figure 4B:
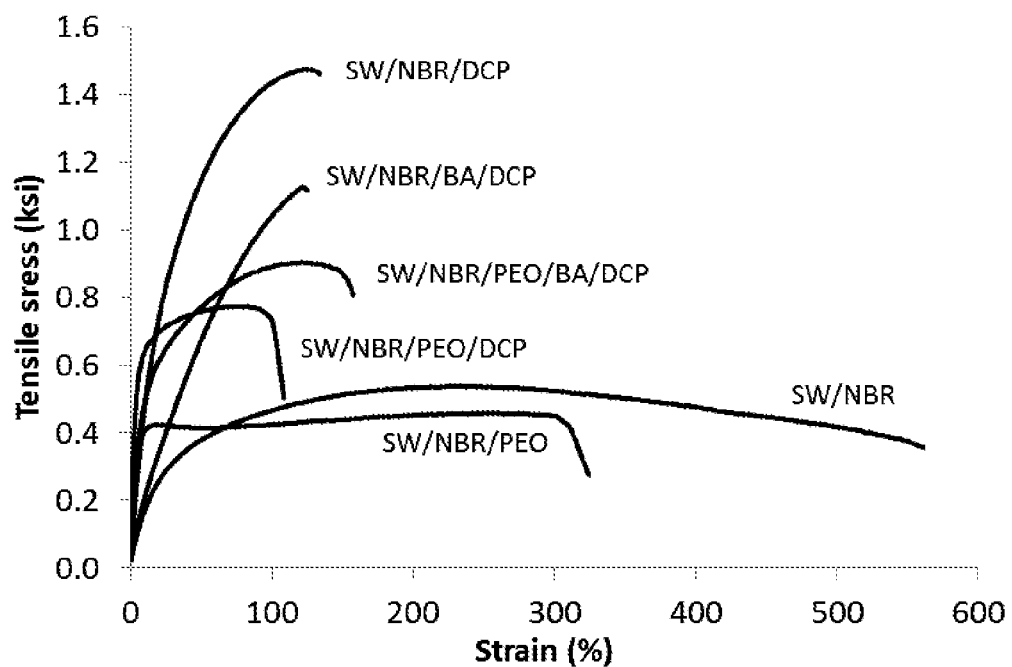

Next, quinary blends were studied by incorporating boric acid in lignin/NBR/PEO/DCP blends of SW and HW. Both HW and SW compositions consisting of PEO, BA, DCP are not as strong or tough as simple lignin/NBR blend crosslinked with DCP. The presence of PEO and BA result in a plasticizing effect for all compositions except the fact that PEO remains phase separated in HW compositions exhibiting yield stress. The representative stress-strain profiles are shown in FIGS. 4A and 4B, which show representative tensile stress-strain profiles of hardwood (HW) lignin-NBR blends with PEO and/or DCP (FIG. 4A) and softwood (SW) lignin-NBR blends with PEO and/or DCP (FIG. 4B), as well as control curves for blends containing only lignin and NBR.

Binary, Ternary, Quaternary, and Quinary Blends with CB Loading

Figure 5A:
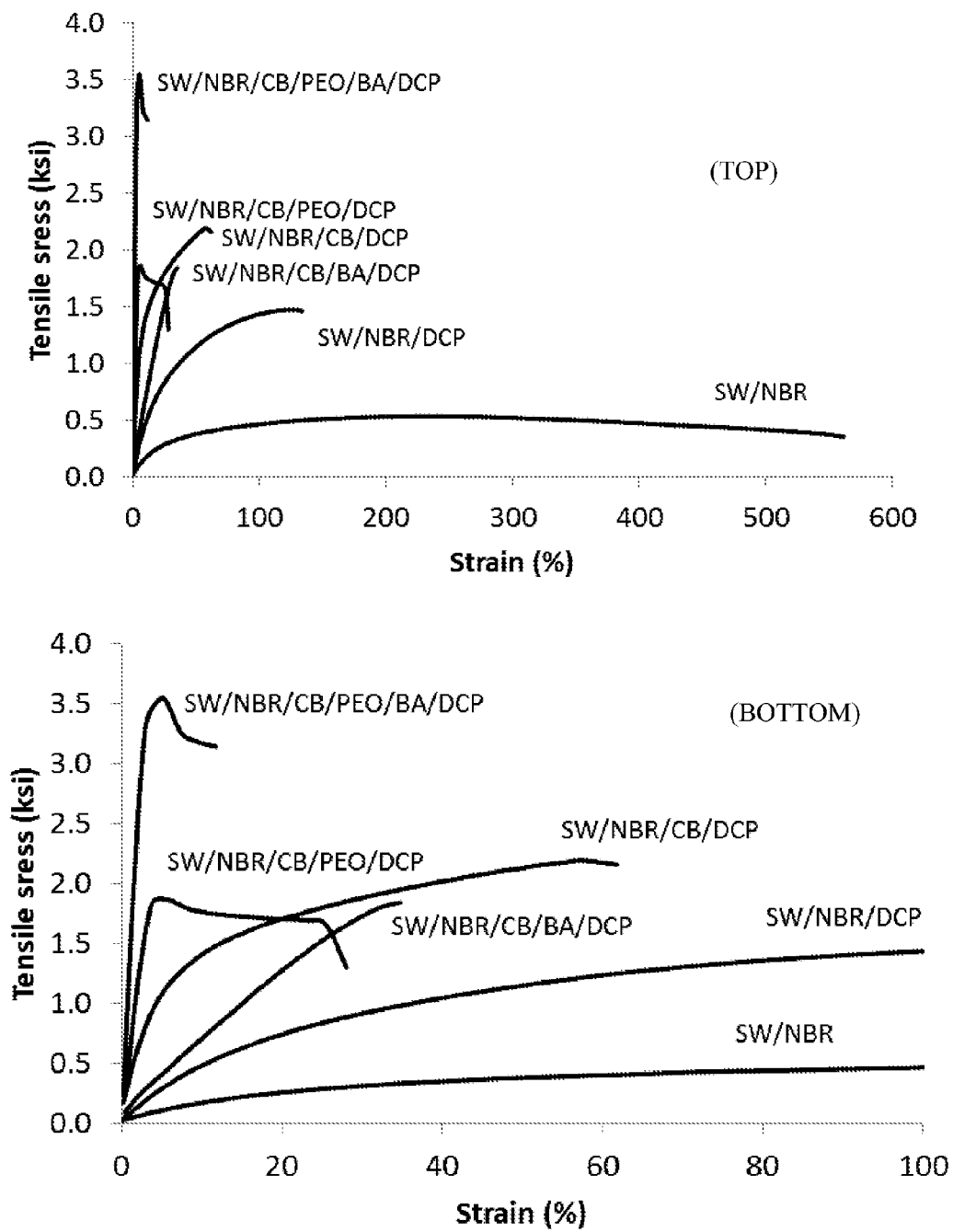
FIGS. 5A (top, bottom), 5B (top, bottom). For FIG. 5A: Representative tensile stress-strain data of softwood (SW) lignin-NBR—CB-DCP blends with PEO and/or BA up to strain of 600% (FIG. 5A, top), along with expanded portion of strain axis up to 100% (FIG. 5A, bottom). For FIG. 5B: Representative tensile stress-strain data of hardwood (HW) lignin-NBR-CB-DCP blends with PEO and/or BA up to strain of 1250% (FIG. 5B, top), along with expanded portion of strain axis up to 200% (FIG. 5B, bottom). Also included in each plot is a control curve for a blend containing only lignin-NBR-CB-DCP, and control curves containing only lignin and NBR, with or without DCP.
Figure 5B:
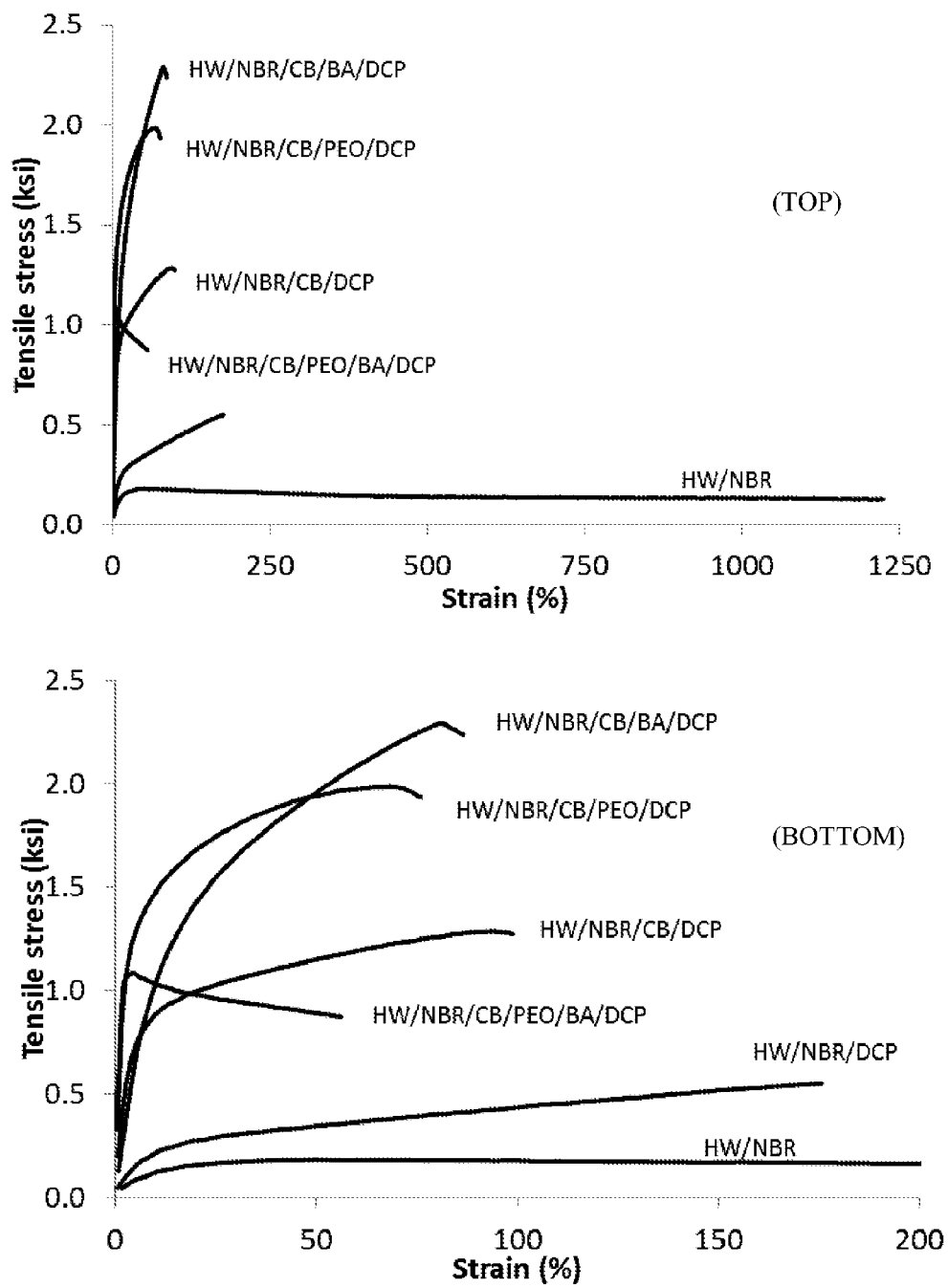

The formulations and properties are shown in Tables 6 and 7 below, respectively. Representative tensile stress-strain data are shown in FIGS. 5A and 5B for softwood and hardwood lignin based compositions, respectively. It is evident from FIG. 5A that the simultaneous presence of boric acid and carbon black results in a significant improvement in yield stress for the PEO phase in the SW/NBR blend, although the SW/NBR/PEO blend does not exhibit a yield stress for the PEO phase (FIG. 4B). Alternatively, from FIG. 5B, it is evident that the simultaneous presence of boric acid and carbon black results in a significant lowering in yield stress associated with the PEO phase in the HW/NBR blend, although the HW/NBR/PEO blend exhibits a more appropriate yield stress associated with the PEO phase (FIG. 4A). Thus, depending on the ingredients, lignin/NBR blends (either HW or SW blends) can be tailored with desired mechanical properties by controlling the interaction of the phases.

TABLE 6

Compositions of lignin/NBR blends

| Blend | Composition | | | | | |
|---|---|---|---|---|---|---|
| | Nitrile rubber (g) | Lignin (HW or SW (g) | Carbon black or CB (g) | PEO (g) | Boric acid or BA (g) | Dicumyl peroxide (g) |
| NBR/Lignin (SW or HW) | 100 | 120 | — | — | — | — |
| NBR/Lignin/ DCP | 100 | 120 | — | — | — | 2.4 |
| NBR/Lignin/ CB/DCP | 100 | 120 | 40 | — | — | 2.4 |
| NBR/Lignin/ CB/BA/DCP | 100 | 120 | 40 | — | 7.2 | 2.4 |
| NBR/Lignin/ CB/PEO/DCP | 100 | 120 | 40 | 20 | — | 2.4 |
| NBR/Lignin/ CB/PEO/BA/ DCP | 100 | 120 | 40 | 20 | 7.2 | 2.4 |

TABLE 7

Properties of lignin/NBR blends

| Blend | Tensile data | | | Thermal characteristics* | |
|---|---|---|---|---|---|
| | Yield stress, ksi (MPa) | Maximum stress, ksi (MPa) | Ultimate elongation (%) | $T_g$ (soft phase) (° C.) | $T_g$ (hard phase) (° C.) |
| SW/NBR | — | 0.6 (3.8 ± 0.4) | 526 ± 96 | −22 | 167 |
| SW/NBR/DCP | — | 1.3 (8.8 ± 1.6) | 126 ± 35 | −18 | 170 |
| SW/NBR/CB/DCP | — | 2.0 (13.7 ± 1.5) | 54 ± 18 | −18 | 172 |
| SW/NBR/CB/PEO/DCP | 1.8 (12.6 ± 0.9) | 1.8 (12.6 ± 0.9) | 34 ± 15 | −22 | 101 |
| SW/NBR/CB/BA/DCP | — | 1.9 (13.0 ± 2.6) | 33 ± 6 | −17 | 146 |
| SW/NBR/CB/PEO/BA/DCP | 3.7 (25.2 ± 1.3) | 3.7 (25.2 ± 1.3) | 13 ± 7 | −22 | NA |
| HW/NBR | — | 0.2 (1.3 ± 0.1) | >2500 | −20 | 150 |
| HW/NBR/DCP | — | 0.7 (4.6 ± 0.8) | 226 ± 80 | −17 | 157 |
| HW/NBR/CB/DCP | — | 1.1 (7.9 ± 0.9) | 95 ± 50 | −18 | 155 |
| HW/NBR/CB/PEO/DCP | — | 1.9 (13.3 ± 1.1) | 69 ± 21 | −21 | 150 |
| HW/NBR/CB/BA/DCP | — | 2.4 (16.7 ± 2.8) | 84 ± 21 | −16 | 112 |
| HW/NBR/CB/PEO/BA/DCP | 1.1 (7.3 ± 0.5) | 1.1 (7.3 ± 0.5) | 109 ± 25 | −21 | 141 |

*$T_g$ data from second heating cycle at 10° C./min scan rate in DSC runs.

As observed in Table 7, the NBR/SW binary blend is stronger than the NBR/HW binary blend. This is likely due to a higher degree of rigidity of SW lignin molecules. Crosslinking of NBR by dicumyl peroxide enhances the properties of blends. In the examples above without CB loading, binary, ternary and quaternary blends of lignin/NBR with and without crosslinking with DCP and similar compositions in the presence of PEO were studied. Reinforcement of the rubber phase in some of those compositions by incorporation of carbon black further toughens the blends. Again, in all these blends, the SW lignin blend remains stronger. However, in the SW/NBR/CB/DCP blend, incorporation of boric acid slightly lowers the properties. The foregoing result with SW lignin is in surprising contrast to boric acid incorporation into the HW/NBR/CB/DCP blend, which makes a much stronger and tougher blend. This suggests a compatibilizing effect of boric acid in DCP-crosslinked NBR/HW blend likely mediated by co-crosslinking of HW lignin and NBR by boric acid, thereby forming a co-continuous morphology with improved interface.

In Example 4, the results indicate a lowering in yield stress in softwood lignin and PEO blend by incorporation of boric acid. In the above example without CB loading, the results indicate lowering of strength in SW/NBR ternary or quinary blends by addition of boric acid, whereas HW/NBR ternary or quinary blends remain unaffected (FIGS. 4A and 4B). The presence of PEO in NBR/lignin blend does not improve strength either. The combination of PEO/boric acid does not enhance the strength either. The presence of carbon black enhances the strength of NBR/lignin blends, but the strength enhancement in the HW/NBR blend is dominant in the presence of either PEO or boric acid. The carbon black/PEO/boric acid blend exhibits a synergistic effect in the NBR/SW combination, with resultant significant enhancement of tensile strength. However, such a combination is generally detrimental for NBR/HW lignin blends. This unexpected result is likely due to the structural differences between HW lignin and SW lignin.

PEO Compatibilization of SW/NBR/CB/BA/DCP Blend vs. PEO Plasticization of HW/NBR/CB/BA/DCP Blend The compositions and properties of lignin/NBR/CB/BA/DCP formulations with variable PEO loading are shown below in Tables 8 and 9, respectively.

TABLE 8

Compositions of lignin/NBR blends for both SW and HW

| Blend | Composition | | | | | |
|---|---|---|---|---|---|---|
| | Nitrile rubber (g) | Lignin (HW or SW) (g) | Carbon black or CB (g) | Dicumyl peroxide (g) | Boric acid or BA (g) | PEO (g) |
| Lignin/NBR/CB/BA/DCP/PEO-0 | 100 | 120 | 40 | 2.4 | 7.2 | 0 |
| Lignin/NBR/CB/BA/DCP/PEO-10 | 100 | 120 | 40 | 2.4 | 7.2 | 10 |
| Lignin/NBR/CB/BA/DCP/PEO-20 | 100 | 120 | 40 | 2.4 | 7.2 | 20 |

TABLE 9

Properties of lignin/NBR blends

| Blend | Tensile data | | | Thermal characteristics* | |
|---|---|---|---|---|---|
| | Yield stress, ksi (MPa) | Maximum stress, ksi (MPa) | Ultimate elongation (%) | $T_g$ (soft phase) (° C.) | $T_g$ (hard phase) (° C.) |
| SW/NBR/CB/BA/DCP/PEO-0 | — | 1.9 (13.0 ± 2.6) | 33 ± 6 | −17 | 146 |
| SW/NBR/CB/BA/DCP/PEO-10 | — | 3.0 (20.7 ± 2.9) | 11 ± 2 | −22 | 160 |
| SW/NBR/CB/BA/DCP/PEO-20 | 3.7 (25.2 ± 1.3) | 3.7 (25.2 ± 1.3) | 13 ± 7 | −22 | NA |
| HW/NBR/CB/BA/DCP/PEO-0 | — | 2.4 (16.7 ± 2.8) | 84 ± 21 | −16 | 112 |

TABLE 9-continued

Properties of lignin/NBR blends

| Blend | Tensile data | | | Thermal characteristics* | |
|---|---|---|---|---|---|
| | Yield stress, ksi (MPa) | Maximum stress, ksi (MPa) | Ultimate elongation (%) | $T_g$ (soft phase) (° C.) | $T_g$ (hard phase) (° C.) |
| HW/NBR/CB/BA/DCP/PEO-10 | — | 1.1 (7.7 ± 0.4) | 84 ± 21 | −22 | 150 |
| HW/NBR/CB/BA/DCP/PEO-20 | 1.1 (7.3 ± 0.5) | 1.1 (7.3 ± 0.5) | 109 ± 25 | −21 | 141 |

*$T_g$ data from second heating cycle at 10° C./min scan rate in DSC runs.

Figure 6A:
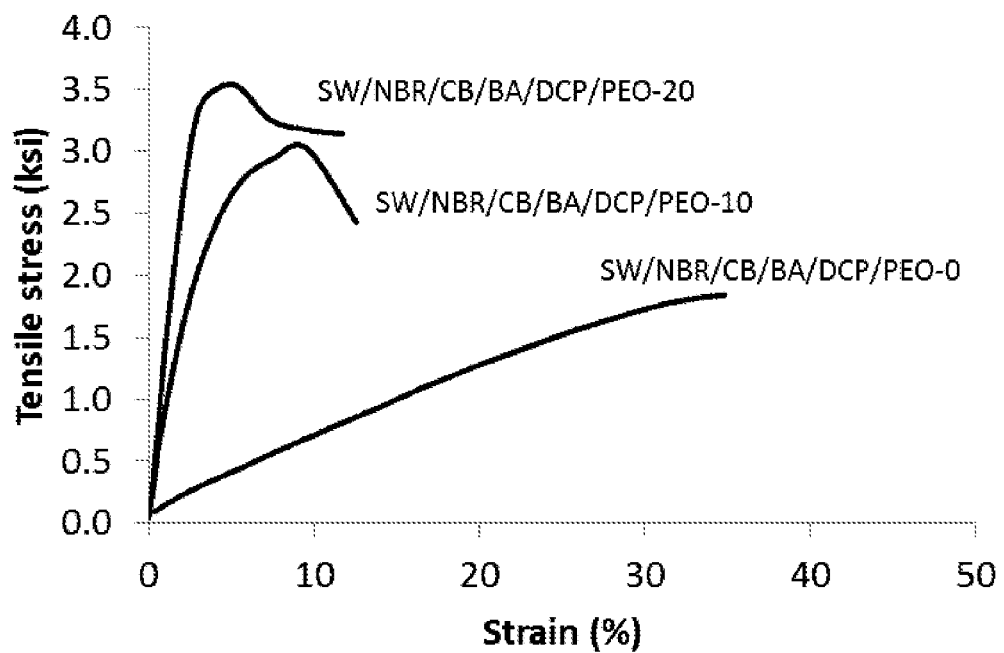
FIGS. 6A, 6B. Representative stress-strain profiles for blends of lignin/NBR/CB/BA/DCP/PEO at variable PEO loadings (as provided in Table 8) for softwood (FIG. 6A) and hardwood (FIG. 6B) lignin based compositions, respectively.
Figure 6B:
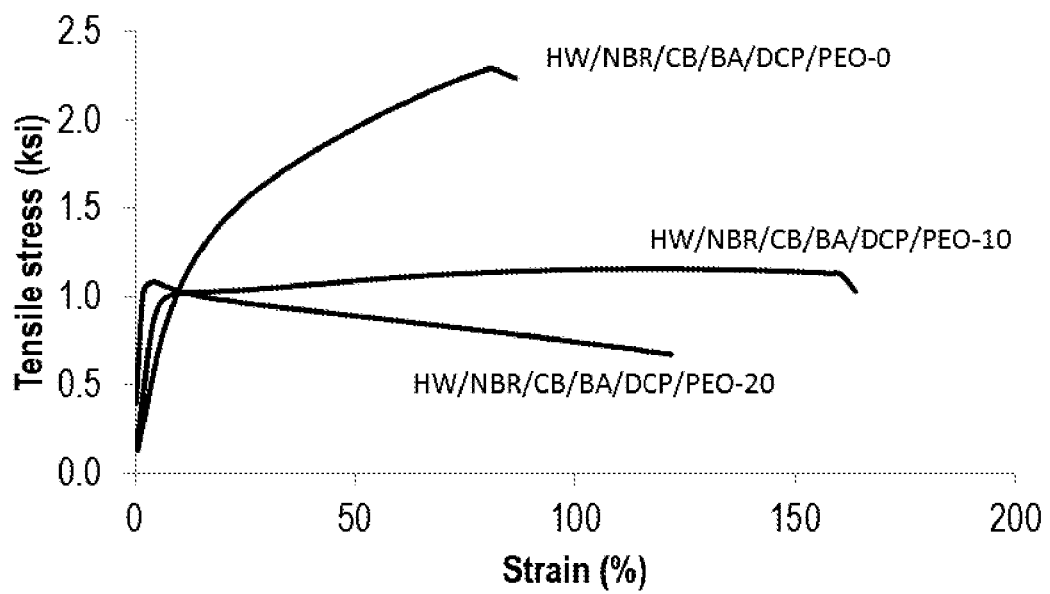

As shown, incorporation of PEO in the HWNBR/CB/BA/DCP blend lowered tensile strength, whereas PEO in the SW/NBR/CB/BA/DCP blend increased tensile strength. Representative stress-strain profiles are shown in FIGS. 5A and 5B for blends of lignin/NBR/CB/BA/DCP at variable PEO loadings (as provided in Table 8) for softwood (FIG. 6A) and hardwood (FIG. 6B) lignin based compositions, respectively. From FIG. 6A, it is clear that yield strength of PEO becomes very high in the SW-containing blend, and it increases with increase in PEO loading with decrease in ultimate elongation. Surprisingly, incorporation of PEO increases ductility of the relatively soft matrix of the HW-containing blend (FIG. 6B), and PEO yield strength is significantly low (less than a third of the value observed in the SW-containing blend).

While there have been shown and described what are at present considered the preferred embodiments of the invention, those skilled in the art may make various changes and modifications which remain within the scope of the invention defined by the appended claims.

What is claimed is:
1. A polymer blend material comprising:
 (i) a first polymer containing hydroxy groups;
 (ii) a second polymer containing nitrile groups; and
 (iii) a modifying component comprising carbon particles and boric acid
 wherein said first polymer and second polymer interact by hydrogen bonding or dative bonding between said hydroxy groups and nitrile groups.
2. The polymer blend material of claim 1, wherein said first polymer is a phenol-containing polymer.
3. The polymer blend material of claim 2, wherein said phenol-containing polymer is a lignin.
4. The polymer blend material of claim 1, wherein said second polymer is selected from nitrile butadiene rubber (NBR), acrylonitrile butadiene styrene (ABS), styrene acrylonitrile (SAN), polycyanoacrylates, and polyacrylonitrile.
5. The polymer blend material of claim 1, wherein said polymer blend further comprises a third polymer that contains ether functional groups.
6. The polymer blend material of claim 5, wherein said third polymer is a polyalkylene oxide.
7. The polymer blend material of claim 1, wherein said carbon particles are selected from carbon black, carbon fiber, graphene, and fullerenes.
8. A method for producing a polymer blend material, the method comprising homogeneously blending a mixture comprising: (i) a first polymer containing hydroxy groups; (ii) a second polymer containing nitrile groups; and (iii) a modifying component comprising carbon particles and boric acid, to form said polymer blended material;
 wherein said first polymer and second polymer interact by hydrogen bonding or dative bonding between said hydroxy groups and nitrile groups.
9. The method of claim 8, wherein said mixture further includes (iv) a radical crosslinking agent.
10. The method of claim 9, wherein said radical crosslinking agent is a peroxide compound.
11. The method of claim 9, wherein the method further comprises subjecting said mixture to free radical generating radiation.
12. The method of claim 8, further comprising subjecting said polymer blend material to a shape-forming process to form a solid molded article of said polymer blended material.
13. The method of claim 8, wherein said first polymer is a phenol-containing polymer.
14. The method of claim 13, wherein said phenol-containing polymer is a lignin.
15. The method of claim 8, wherein said second polymer is selected from nitrile butadiene rubber (NBR), acrylonitrile butadiene styrene (ABS), styrene acrylonitrile (SAN), polycyanoacrylates, and polyacrylonitrile.
16. The method of claim 8, wherein said polymer blend further comprises a third polymer that contains ether functional groups.
17. The method of claim 16, wherein said third polymer is a polyalkylene oxide.
18. The method of claim 8, wherein said carbon particles are selected from carbon black, carbon fiber, and fullerenes.

* * * * *